US 8,165,993 B2

(12) United States Patent
Broda et al.

(10) Patent No.: US 8,165,993 B2
(45) Date of Patent: Apr. 24, 2012

(54) BUSINESS INTELLIGENCE SYSTEM WITH INTERFACE THAT PROVIDES FOR IMMEDIATE USER ACTION

(75) Inventors: Tal Broda, Sunnyvale, CA (US); Kimberly McGraw, Sunnyvale, CA (US); Craig R. Powers, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 201 days.

(21) Appl. No.: 11/299,441

(22) Filed: Dec. 12, 2005

(65) Prior Publication Data

US 2006/0089939 A1    Apr. 27, 2006

Related U.S. Application Data

(63) Continuation-in-part of application No. 10/237,559, filed on Sep. 6, 2002, now Pat. No. 7,454,423.

(51) Int. Cl.
*G06F 17/00* (2006.01)
(52) U.S. Cl. ....................................... 707/634
(58) Field of Classification Search ................... 707/224
See application file for complete search history.

(56) References Cited

U.S. PATENT DOCUMENTS

| | | |
|---|---|---|
| 5,010,478 A | 4/1991 | Deran |
| 5,033,009 A | 7/1991 | Dubnoff |
| 5,283,894 A | 2/1994 | Deran |
| 5,510,980 A | 4/1996 | Peters |
| 5,553,215 A | 9/1996 | Kaethler |

(Continued)

FOREIGN PATENT DOCUMENTS

WO    WO 01/63466 A2    8/2001

OTHER PUBLICATIONS

"Workflow-based Processing Monitoring and Controlling—Technical and Organizational Issues", by Micheael zur Muahlen et al., Proceedings of the 33rd Hawaii International Conference on System Science—2000, pp. 1-10.*

(Continued)

*Primary Examiner* — Neveen Abel Jalil
*Assistant Examiner* — Kellye Buckingham
(74) *Attorney, Agent, or Firm* — Kilpatrick Townsend & Stockton LLP

(57) ABSTRACT

A business intelligence system includes a business activity monitor with a data cache to receive and store enterprise data integrated from a plurality of enterprise applications, the data cache being updated in real-time as the enterprise data changes. A computer coupled with the data cache runs a program that produces a graphical user interface on a display. The graphical user interface provides a user with a real-time report of the enterprise data and a page that allows the user to specify at least one action affecting operation of the enterprise. The page also including a button selection of which causes the computer to send a first message designating one or more selected actions to the BAM. In response, the BAM sends a second message to one or more of the enterprise applications to execute the one or more selected actions in real-time. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

24 Claims, 13 Drawing Sheets

U.S. PATENT DOCUMENTS

| | | | |
|---|---|---|---|
| 5,592,608 A | 1/1997 | Weber et al. | |
| 5,613,131 A | 3/1997 | Moss et al. | |
| 5,615,362 A | 3/1997 | Jensen et al. | |
| 5,654,726 A | 8/1997 | Mima et al. | 345/2.2 |
| 5,717,895 A | 2/1998 | Leedom et al. | |
| 5,721,847 A | 2/1998 | Johnson | |
| 5,754,774 A | 5/1998 | Bittinger et al. | |
| 5,758,337 A | 5/1998 | Hammond | |
| 5,765,164 A | 6/1998 | Prasad et al. | |
| 5,778,372 A | 7/1998 | Cordell et al. | |
| 5,781,911 A | 7/1998 | Young et al. | |
| 5,784,275 A | 7/1998 | Sojoodi et al. | |
| 5,787,409 A | 7/1998 | Seiffert et al. | |
| 5,809,267 A | 9/1998 | Moran et al. | |
| 5,812,840 A | 9/1998 | Sxhwartz | |
| 5,831,609 A | 11/1998 | London et al. | |
| 5,831,615 A | 11/1998 | Drews et al. | |
| 5,857,201 A | 1/1999 | Wright, Jr. et al. | |
| 5,862,325 A | 1/1999 | Reed et al. | |
| 5,864,669 A | 1/1999 | Osterman et al. | |
| 5,890,174 A | 3/1999 | Khanna et al. | |
| 5,893,126 A | 4/1999 | Drews et al. | |
| 5,893,150 A | 4/1999 | Hagersten et al. | |
| 5,898,434 A | 4/1999 | Small et al. | |
| 5,918,009 A | 6/1999 | Gehani et al. | |
| 5,922,044 A | 7/1999 | Banthia | |
| 5,926,177 A | 7/1999 | Hatanaka et al. | |
| 5,928,327 A | 7/1999 | Wang et al. | |
| 5,930,794 A | 7/1999 | Linenbach et al. | |
| 5,943,620 A | 8/1999 | Boltz et al. | |
| 5,974,236 A | 10/1999 | Sherman | |
| 6,023,694 A | 2/2000 | Kouchi et al. | |
| 6,025,844 A | 2/2000 | Parsons | |
| 6,035,324 A | 3/2000 | Chang | |
| 6,038,558 A | 3/2000 | Powers et al. | |
| 6,055,548 A | 4/2000 | Comer et al. | |
| 6,070,197 A | 5/2000 | Cobb et al. | |
| 6,073,242 A | 6/2000 | Hardy et al. | |
| 6,075,530 A | 6/2000 | Lucas et al. | |
| 6,088,481 A | 7/2000 | Okamoto et al. | |
| 6,092,102 A | 7/2000 | Wagner | |
| 6,094,681 A | 7/2000 | Shaffer et al. | |
| 6,112,236 A | 8/2000 | Dollin et al. | |
| 6,125,177 A | 9/2000 | Whittaker | |
| 6,141,659 A | 10/2000 | Barker et al. | |
| 6,170,019 B1 | 1/2001 | Dresel et al. | |
| 6,175,859 B1 | 1/2001 | Mohler | |
| 6,182,116 B1 | 1/2001 | Namma et al. | |
| 6,185,582 B1 | 2/2001 | Zellweger et al. | |
| 6,189,069 B1 | 2/2001 | Parkes et al. | |
| 6,201,539 B1 | 3/2001 | Miller et al. | |
| 6,204,846 B1 | 3/2001 | Little et al. | |
| 6,205,474 B1 | 3/2001 | Hurley | |
| 6,208,990 B1 | 3/2001 | Suresh et al. | |
| 6,219,042 B1 | 4/2001 | Anderson et al. | |
| 6,233,578 B1 | 5/2001 | Machihara et al. | |
| 6,239,797 B1 | 5/2001 | Hills et al. | |
| 6,240,444 B1 | 5/2001 | Fin et al. | |
| 6,243,698 B1 | 6/2001 | Powers et al. | 707/2 |
| 6,243,713 B1 | 6/2001 | Nelson et al. | |
| 6,256,649 B1 | 7/2001 | Mackinlay et al. | |
| 6,256,676 B1 | 7/2001 | Taylor et al. | 709/246 |
| 6,260,114 B1 | 7/2001 | Schug | |
| 6,269,393 B1 | 7/2001 | Yost et al. | |
| 6,292,803 B1 | 9/2001 | Richardson et al. | |
| 6,301,601 B1 | 10/2001 | Helland et al. | |
| 6,301,609 B1 | 10/2001 | Aravamudan et al. | |
| 6,304,546 B1 | 10/2001 | Natarajan et al. | |
| 6,314,463 B1 | 11/2001 | Abbott et al. | |
| 6,317,737 B1 | 11/2001 | Gorelik et al. | |
| 6,336,135 B1 | 1/2002 | Niblett et al. | |
| 6,341,312 B1 | 1/2002 | French et al. | |
| 6,348,933 B1 | 2/2002 | Walls et al. | |
| 6,363,363 B1 | 3/2002 | Haller et al. | |
| 6,393,421 B1 | 5/2002 | Paglin | |
| 6,397,217 B1 | 5/2002 | Melbin | |
| 6,430,576 B1 | 8/2002 | Gates et al. | |
| 6,430,604 B1 | 8/2002 | Ogle et al. | |
| 6,449,344 B1 | 9/2002 | Goldfinger et al. | |
| 6,467,052 B1 | 10/2002 | Kaler et al. | |
| 6,480,847 B1 | 11/2002 | Linenbach et al. | |
| 6,501,956 B1 | 12/2002 | Weeren et al. | |
| 6,510,457 B1 | 1/2003 | Ayukawa et al. | |
| 6,513,047 B1 | 1/2003 | Talley | |
| 6,519,568 B1 | 2/2003 | Harvey et al. | |
| 6,519,601 B1 | 2/2003 | Bosch | |
| 6,523,046 B2 | 2/2003 | Liu et al. | |
| 6,532,465 B2 | 3/2003 | Hartley et al. | |
| 6,535,227 B1 | 3/2003 | Fox et al. | |
| 6,542,165 B1 | 4/2003 | Ohkado | |
| 6,567,796 B1 | 5/2003 | Yost et al. | |
| 6,567,814 B1 | 5/2003 | Bankier et al. | |
| 6,574,618 B2 | 6/2003 | Eylon et al. | |
| 6,574,639 B2 | 6/2003 | Carey et al. | |
| 6,591,277 B2 | 7/2003 | Spence et al. | |
| 6,591,278 B1 | 7/2003 | Ernst | |
| 6,598,167 B2 | 7/2003 | Devine et al. | |
| 6,606,596 B1 | 8/2003 | Zirngibl et al. | |
| 6,640,234 B1 | 10/2003 | Coffen et al. | |
| 6,647,272 B1 | 11/2003 | Asikainen | |
| 6,651,055 B1 | 11/2003 | Kilmer et al. | |
| 6,651,142 B1 | 11/2003 | Gorelik et al. | |
| 6,654,790 B2 | 11/2003 | Ogle et al. | |
| 6,664,978 B1 | 12/2003 | Kekic et al. | |
| 6,668,173 B2 | 12/2003 | Greene | |
| 6,678,719 B1 | 1/2004 | Stimmel | |
| 6,687,360 B2 | 2/2004 | Kung et al. | |
| 6,701,485 B1 | 3/2004 | Igra et al. | |
| 6,714,982 B1 | 3/2004 | McDonough et al. | |
| 6,731,314 B1 | 5/2004 | Cheng et al. | 715/848 |
| 6,745,193 B1 | 6/2004 | Horvitz et al. | |
| 6,766,418 B1 | 7/2004 | Alexander et al. | |
| 6,775,267 B1 | 8/2004 | Kung et al. | |
| 6,775,298 B1 | 8/2004 | Aggarwal | |
| 6,782,424 B2 | 8/2004 | Yodaiken | |
| 6,789,083 B2 | 9/2004 | Thelen | |
| 6,789,090 B1 * | 9/2004 | Miyake et al. | 709/223 |
| 6,792,456 B1 | 9/2004 | Hellerstein et al. | |
| 6,807,562 B1 | 10/2004 | Pennock et al. | |
| 6,807,583 B2 | 10/2004 | Hrischuk et al. | |
| 6,832,341 B1 | 12/2004 | Vijayan | |
| 6,839,737 B1 | 1/2005 | Friskel | |
| 6,870,830 B1 | 3/2005 | Schuster et al. | |
| 6,898,625 B2 | 5/2005 | Henry et al. | |
| 6,901,592 B2 | 5/2005 | Mar et al. | |
| 6,907,422 B1 | 6/2005 | Predovic | |
| 6,915,457 B1 | 7/2005 | Miller | |
| 6,920,607 B1 | 7/2005 | Ali et al. | |
| 6,937,713 B1 | 8/2005 | Kung et al. | |
| 6,938,221 B2 | 8/2005 | Nguyen | |
| 6,941,345 B1 | 9/2005 | Kapil et al. | |
| 6,941,351 B2 | 9/2005 | Vetrivelkumaran et al. | |
| 6,954,757 B2 * | 10/2005 | Zargham et al. | 707/101 |
| 6,954,902 B2 | 10/2005 | Noma et al. | |
| 6,996,768 B1 | 2/2006 | Elo et al. | |
| 7,003,568 B1 | 2/2006 | Chikada et al. | |
| 7,003,731 B1 | 2/2006 | Rhoads et al. | |
| 7,024,474 B2 | 4/2006 | Clubb et al. | |
| 7,028,092 B2 | 4/2006 | MeLampy et al. | |
| 7,031,314 B2 | 4/2006 | Craig et al. | |
| 7,032,006 B2 | 4/2006 | Zhuk | |
| 7,035,923 B1 | 4/2006 | Yoakum et al. | |
| 7,058,953 B2 | 6/2006 | Willard et al. | |
| 7,096,432 B2 | 8/2006 | Huapaya et al. | |
| 7,113,934 B2 * | 9/2006 | Levesque et al. | 1/1 |
| 7,113,964 B1 | 9/2006 | Bequet et al. | |
| 7,120,139 B1 | 10/2006 | Kung et al. | |
| 7,139,797 B1 | 11/2006 | Yoakum et al. | |
| 7,171,473 B1 | 1/2007 | Eftis et al. | |
| 7,174,339 B1 | 2/2007 | Wucherer et al. | |
| 7,177,909 B2 | 2/2007 | Stark et al. | |
| 7,188,160 B2 * | 3/2007 | Champagne et al. | 709/220 |
| 7,197,565 B2 | 3/2007 | Abdelaziz et al. | |
| 7,221,658 B1 | 5/2007 | Armstrong et al. | |
| 7,222,294 B2 | 5/2007 | Coffen et al. | |
| 7,233,979 B2 | 6/2007 | Dickerman et al. | |
| 7,243,124 B1 | 7/2007 | Gardner et al. | |

| | | |
|---|---|---|
| 7,243,127 B2 | 7/2007 | Tabayoyon, Jr. et al. |
| 7,243,130 B2 | 7/2007 | Horvitz et al. |
| 7,269,625 B1* | 9/2007 | Willhide et al. ............... 709/206 |
| 7,269,627 B2 | 9/2007 | Knauerhase |
| 7,272,660 B1 | 9/2007 | Powers et al. |
| 7,275,215 B2 | 9/2007 | Werndorfer et al. |
| 7,283,805 B2 | 10/2007 | Agrawal |
| 7,284,034 B2 | 10/2007 | Matsa et al. |
| 7,296,217 B1 | 11/2007 | Earnshaw et al. |
| 7,299,257 B2 | 11/2007 | Boyer et al. |
| 7,310,532 B2 | 12/2007 | Knauerhase et al. |
| 7,313,593 B1 | 12/2007 | Pulito et al. |
| 7,313,617 B2 | 12/2007 | Malik et al. |
| 7,353,455 B2 | 4/2008 | Malik |
| 7,359,938 B1 | 4/2008 | Davies et al. |
| 7,373,428 B1 | 5/2008 | Armstrong et al. |
| 7,379,963 B1 | 5/2008 | Khare et al. |
| 7,386,588 B2 | 6/2008 | Mousseau et al. |
| 7,389,351 B2 | 6/2008 | Horvitz |
| 7,392,478 B2 | 6/2008 | Aureglia et al. |
| 7,401,158 B2 | 7/2008 | Beauchamp et al. |
| 7,406,569 B2 | 7/2008 | van de Waerdt |
| 7,412,481 B2 | 8/2008 | Nicholls et al. |
| 7,412,486 B1 | 8/2008 | Petrack et al. |
| 7,412,518 B1 | 8/2008 | Duigou et al. |
| 7,412,645 B2 | 8/2008 | Kotler et al. |
| 7,415,502 B2 | 8/2008 | Vishik et al. |
| 7,426,059 B2 | 9/2008 | Broda et al. |
| 7,433,922 B2 | 10/2008 | Engstrom |
| 7,436,939 B1 | 10/2008 | Packingham |
| 7,436,947 B2 | 10/2008 | Ordille et al. |
| 7,454,423 B2 | 11/2008 | Powers et al. |
| 7,461,378 B2 | 12/2008 | Beyda |
| 7,464,139 B2 | 12/2008 | Malik |
| 7,487,437 B2 | 2/2009 | Aureglia et al. |
| 7,552,204 B2 | 6/2009 | Bobde et al. |
| 7,554,938 B1 | 6/2009 | Smith et al. |
| 7,627,666 B1 | 12/2009 | DeGiulio et al. |
| 7,631,047 B1 | 12/2009 | Adamczyk |
| 7,657,616 B1 | 2/2010 | Poling et al. |
| 7,664,817 B2 | 2/2010 | Watanabe et al. |
| 7,668,915 B2 | 2/2010 | Couts et al. |
| 7,668,917 B2 | 2/2010 | Netsch et al. |
| 7,725,523 B2 | 5/2010 | Bolnick et al. |
| 7,899,879 B2 | 3/2011 | Broda |
| 7,904,823 B2 | 3/2011 | Beauchamp et al. |
| 7,912,899 B2 | 3/2011 | Beauchamp et al. |
| 7,941,542 B2 | 5/2011 | Broda et al. |
| 7,945,846 B2 | 5/2011 | Beauchamp et al. |
| 8,001,185 B2 | 8/2011 | Nicholls et al. |
| 2001/0034733 A1 | 10/2001 | Prompt et al. |
| 2001/0039616 A1 | 11/2001 | Kumagai et al. |
| 2001/0040945 A1 | 11/2001 | Fujino et al. |
| 2001/0049683 A1 | 12/2001 | Yoshikawa |
| 2001/0049721 A1 | 12/2001 | Blair et al. |
| 2002/0013853 A1 | 1/2002 | Baber et al. |
| 2002/0023143 A1 | 2/2002 | Stephenson et al. |
| 2002/0032602 A1 | 3/2002 | Lanzillo et al. |
| 2002/0038217 A1 | 3/2002 | Young |
| 2002/0038362 A1* | 3/2002 | Bhatia et al. ................. 709/224 |
| 2002/0056000 A1 | 5/2002 | Coussement |
| 2002/0057657 A1 | 5/2002 | La Porta et al. |
| 2002/0057678 A1 | 5/2002 | Jiang et al. |
| 2002/0059425 A1 | 5/2002 | Belfiore et al. |
| 2002/0059472 A1 | 5/2002 | Wollrath et al. |
| 2002/0065894 A1 | 5/2002 | Dalal et al. |
| 2002/0073236 A1* | 6/2002 | Helgeson et al. ............. 709/246 |
| 2002/0075303 A1 | 6/2002 | Thompson et al. |
| 2002/0078208 A1 | 6/2002 | Crump et al. |
| 2002/0083067 A1* | 6/2002 | Tamayo et al. ............... 707/100 |
| 2002/0083072 A1* | 6/2002 | Steuart .......................... 707/102 |
| 2002/0083118 A1 | 6/2002 | Sim |
| 2002/0095465 A1 | 7/2002 | Banks et al. |
| 2002/0103909 A1 | 8/2002 | Devine et al. |
| 2002/0107864 A1* | 8/2002 | Battas et al. .................. 707/101 |
| 2002/0107905 A1 | 8/2002 | Roe et al. |
| 2002/0107957 A1 | 8/2002 | Zargham et al. |
| 2002/0116362 A1 | 8/2002 | Li et al. ............................. 707/1 |
| 2002/0116461 A1 | 8/2002 | Diacakis et al. |
| 2002/0120697 A1 | 8/2002 | Generous et al. |
| 2002/0120765 A1 | 8/2002 | Boehmke ...................... 709/231 |
| 2002/0138640 A1 | 9/2002 | Raz et al. |
| 2002/0143710 A1 | 10/2002 | Liu |
| 2002/0147777 A1 | 10/2002 | Hackbarth et al. |
| 2002/0152402 A1 | 10/2002 | Tov et al. |
| 2002/0165849 A1 | 11/2002 | Singh et al. |
| 2002/0178035 A1* | 11/2002 | Lajouanie ......................... 705/7 |
| 2002/0178353 A1 | 11/2002 | Graham |
| 2002/0184187 A1 | 12/2002 | Bakalash et al. |
| 2002/0194393 A1 | 12/2002 | Hrischuk et al. |
| 2002/0198985 A1 | 12/2002 | Fraenkel et al. |
| 2002/0199203 A1 | 12/2002 | Duffy et al. |
| 2003/0004742 A1* | 1/2003 | Palmer et al. ...................... 705/1 |
| 2003/0009603 A1 | 1/2003 | Ruths et al. |
| 2003/0014513 A1 | 1/2003 | Ruths et al. |
| 2003/0018719 A1 | 1/2003 | Ruths et al. |
| 2003/0023691 A1 | 1/2003 | Knauerhase |
| 2003/0028597 A1 | 2/2003 | Salmi et al. |
| 2003/0028682 A1 | 2/2003 | Sutherland |
| 2003/0028683 A1 | 2/2003 | Yorke et al. |
| 2003/0033329 A1 | 2/2003 | Bergman et al. |
| 2003/0037103 A1 | 2/2003 | Salmi et al. |
| 2003/0037113 A1 | 2/2003 | Petrovykh |
| 2003/0041108 A1 | 2/2003 | Henrick et al. |
| 2003/0071850 A1 | 4/2003 | Geidl |
| 2003/0074393 A1 | 4/2003 | Peart |
| 2003/0088633 A1 | 5/2003 | Chiu et al. |
| 2003/0093585 A1 | 5/2003 | Allan |
| 2003/0101201 A1 | 5/2003 | Saylor et al. |
| 2003/0101223 A1 | 5/2003 | Pace et al. |
| 2003/0105837 A1 | 6/2003 | Kamen et al. |
| 2003/0110249 A1* | 6/2003 | Buus et al. ..................... 709/224 |
| 2003/0112948 A1 | 6/2003 | Brown et al. |
| 2003/0115186 A1* | 6/2003 | Wilkinson et al. ................ 707/3 |
| 2003/0120805 A1 | 6/2003 | Couts et al. |
| 2003/0126136 A1 | 7/2003 | Omoigui |
| 2003/0131069 A1 | 7/2003 | Lucovsky et al. |
| 2003/0131142 A1 | 7/2003 | Horvitz et al. |
| 2003/0154177 A1 | 8/2003 | Holland et al. |
| 2003/0158873 A1 | 8/2003 | Sawdon et al. |
| 2003/0182428 A1 | 9/2003 | Li et al. |
| 2003/0182461 A1 | 9/2003 | Stelting et al. |
| 2003/0187971 A1 | 10/2003 | Uliano et al. |
| 2003/0204741 A1 | 10/2003 | Schoen et al. |
| 2003/0208543 A1 | 11/2003 | Enete et al. |
| 2003/0217081 A1 | 11/2003 | White et al. .................... 707/203 |
| 2003/0217142 A1 | 11/2003 | Bobde et al. |
| 2003/0218631 A1 | 11/2003 | Malik |
| 2003/0220860 A1 | 11/2003 | Heytens et al. |
| 2003/0229722 A1 | 12/2003 | Beyda |
| 2003/0235279 A1 | 12/2003 | Richomme |
| 2004/0002958 A1 | 1/2004 | Seshadri et al. |
| 2004/0003090 A1 | 1/2004 | Deeds |
| 2004/0010543 A1 | 1/2004 | Grobman |
| 2004/0019695 A1 | 1/2004 | Fellenstein et al. |
| 2004/0024822 A1 | 2/2004 | Werndorfer et al. |
| 2004/0030762 A1 | 2/2004 | Silverthorne et al. |
| 2004/0039776 A1 | 2/2004 | Ballard |
| 2004/0039800 A1 | 2/2004 | Black et al. |
| 2004/0049477 A1 | 3/2004 | Powers et al. |
| 2004/0054802 A1 | 3/2004 | Beauchamp et al. |
| 2004/0060001 A1 | 3/2004 | Coffen et al. |
| 2004/0073596 A1 | 4/2004 | Kloninger et al. |
| 2004/0087300 A1 | 5/2004 | Lewis |
| 2004/0146044 A1 | 7/2004 | Herkerdorf et al. ............ 370/351 |
| 2004/0152477 A1 | 8/2004 | Wu et al. |
| 2004/0254998 A1 | 12/2004 | Horvitz |
| 2005/0004984 A1 | 1/2005 | Simpson |
| 2005/0055329 A1 | 3/2005 | Bakalash et al. |
| 2005/0086211 A1 | 4/2005 | Mayer |
| 2005/0102294 A1 | 5/2005 | Coldewey ...................... 707/100 |
| 2005/0102611 A1 | 5/2005 | Chen |
| 2005/0125377 A1 | 6/2005 | Kotler |
| 2005/0144114 A1 | 6/2005 | Ruggieri et al. |
| 2005/0187982 A1 | 8/2005 | Sato |
| 2006/0161540 A1 | 7/2006 | Schmitz et al. |
| 2006/0206589 A1 | 9/2006 | Lentini et al. |
| 2006/0259626 A1 | 11/2006 | Stone-Kaplan et al. |

| | | |
|---|---|---|
| 2007/0192495 A1 | 8/2007 | Marais |
| 2008/0043256 A1 | 2/2008 | Broda et al. |
| 2008/0046505 A1 | 2/2008 | Netsch et al. |
| 2008/0046506 A1 | 2/2008 | Broda |
| 2008/0046510 A1 | 2/2008 | Beauchamp et al. |
| 2008/0046536 A1 | 2/2008 | Broda |
| 2008/0046556 A1 | 2/2008 | Nicholls et al. |
| 2008/0046568 A1 | 2/2008 | Broda et al. |
| 2008/0046803 A1 | 2/2008 | Beauchamp et al. |
| 2008/0046837 A1 | 2/2008 | Beauchamp et al. |
| 2008/0077656 A1 | 3/2008 | Broda |
| 2008/0148289 A1 | 6/2008 | Nicholls et al. |
| 2008/0155020 A1 | 6/2008 | Beauchamp et al. |
| 2009/0031205 A1 | 1/2009 | Aureglia et al. |
| 2009/0037803 A1 | 2/2009 | Bauchot |

OTHER PUBLICATIONS

A Data Warehouse Tutorial, Paretoanalysts, Dec. 27, 2001.
Achieving Global Business Visibility With the webMethods Integration Platform, webMethods, Inc., Sep. 2001.
Adding Printing Capabilities, Interactivetools.com, posted Oct. 19, 2002.
An Introduction to Messaging and Queuing, IBM Corp., Jun. 1995.
Bernstein, Philip A. et al., "Data Warehouse Scenarios for Model Management," Microsoft Corporation, 2000.
Brewster, Stephen, "Windowing Systems," Glasgow Interactive Systems Group, 2001.
Brocade Rapidly Implements Customer and Sales Analytics, Informatica Corporation, 2002.
Business Intelligence Software: Engendering a Quiet Revolution in the Business Place, MicroStrategy, Dec. 20, 2002.
Business Rules, Powering Business and E-Business, White Paper, ILOG, May 2001.
Business Transformation Through End-to-End Integration, IBM, Aug. 2002.
Cimino, Steve, "How Can I Print a Web Page in ASP?", Internet.com Corp., posted Jul. 27, 2001.
Corke, Randy, "Keeping Data Warehouse Current: Automating Incremental Updates with Data Movement," DM Direct, May 1999.
Dabke, P, "Enterprise Integration Via Corba-Based Information Agents," IEEE Internet Computing, Sep./Oct. 1999, pp. 49-57, vol. 3, Issue 5.
Day, Mark et al., "A Model for Presences and Instant Messaging," Network Working Group, Request for Comments 2778, The Internet Society, Feb. 2000.
Excel 2000, publ. by Microsoft in 1999, screen captures pp. 1-12.
Express Communicator, White Paper, ACD Systems Ltd., May 2001.
Extensible Markup Language (XML) 1.0 (Second Edition), Oct. 6, 2000, printed from w3.org.
Goldsmith, D. et al., "UTF-7: A Mail-Safe Transformation Format of Unicode," Network Working Group, Request for Comments: 2152, Obsoletes: RFC 1642, Category: Informational, May 1997, pp. 1-15.
Guidelines for Implementing and Using the NBS Data, Federal Information Processing Standards, Publication 74, Apr. 1, 1981.
Gwinn, Allen, "Simple Network Paging Protocol—Version 3—Two-Way Enhanced," Network Working Group, Oct. 1995.
Habraken, J. "Ten Minute Guide to Microsoft Excel 2002," Sep. 27, 2001, Que, Section, "Lesson 6, Performing Calculations with Functions."
Handley, Mark et al., "SIP: Session Initiation Protocol," Network Working Group, Request for Comments 2543, The Internet Society, Mar. 1999.
Howlett, Dennis et al., "Delivering Value Back to the Business: A Guide to Successful Portal Selection and Implementation." TIBCO Software, 2002.
Howlett, Jake, "Further Control of Printing," Codestore, Jan. 3, 2002.
ILOG Views 2D Graphics: The C++ Library for Interactive 2D Graphics, ILOG.
Implementing the RosettaNet eBusiness Standard: Automating High-tech Supply Chains Using Business Ware for RosettaNet, Vitria Technology Inc., 2000.
Informatica Applications: Informatica Customer Relationship Analytics, Informatica Corporation, 2002.
Informatica Applications: Leverage Your Enterprise Information for Better Decision Making, Informatica Corporation, 2002.
Introduction to Dynamic HTML, printed from microsoft.com.
Jabber: About: Technology Overview, Jabber Software Foundation, Dec. 12, 2003.
JavaScript: MSIE 5 Unable to Print Child Window. Experts Exhange, posted Jun. 7, 2000.
Karn, P. et al., "The ESP Triple DES Transform," Network Working Group, Request for Comments: 1851, Category: Experimental, Sep. 1995, pp. 1-11.
Long, Allan Christian et al., "PDA and Gesture Use in Practice: Insights for Designers of Pen-based User Interfaces," University of California at Berkeley, 1997.
Loo, Thomas et al., "How Can I Print a Document That is Not Currently Loaded Into a Frame or Window?" Synop Software, Apr. 24, 2002.
Microsoft Excel Print Screen Images (figs. 1-6).
Middleware—The Essential Component for Enterprise Client/Server Applications, International Systems Group, Inc., Feb. 1997.
Moran, Brian et al., "Getting to Know OLAP and MDX," Windows IT Pro, Instant Doc #5112, Apr. 1999.
Movva, Ramu et al., "MSM Messenger Service 1.0 Protocol," Internet Draft, Aug. 1999.
MQSeries Link for R/3, IBM, 1998.
Nonsenko, Andrew, "Scripting Support for Web Page Printing," Microsoft Corporation, Mar. 28, 2000.
Oikarinen, Jarkko et al., "Internet Relay Chat Protocol," Network Working Group, May 1993.
Perfetti, Christine et al., "Macromedia Flash: A New Hope for Web Applications." User Interface Engineering, 2002.
Pioch, Nicholas, "A Short IRC Primer," Jan. 1, 1997.
Print Without Pop Up Window Using Javascript, Experts Exchange, posted Nov. 3, 2002.
Protecting the Enterprise from Rogue Protocols, Akonix Systems, Inc., 2002.
Relational OLAP: An Enterprise-Wide Data Delivery Architecture, MicroStrategy, Inc., 1994.
Report of Novelty Search, PATENTEC, dated Apr. 4, 2004.
Report of Novelty Search, PATENTEC, dated Oct. 16, 2003.
Richardson, Tristan et al., "The RFB Protocol," ORL Cambridge, Jul. 16, 1998.
Roman, S. "Writing Excel Macros with VBA: Second Edition," Jun. 25, 2002, Chapter 6: Functions and Subroutines.
Sametime 3 Features and Benefits, IBM.
Sametime for iSeries 2.5, Lotus Software, IBM Corporation, 2002.
Schoedl, Arno, "Issues for Implementing User Interface Software," Georgia Institute of Technology, Sep. 26, 1998.
Scripting Support for Web Page Printing Sample, Microsoft Corp., 2004.
Smith, Jan, "Browser Basics: Printing," http://www.jegsworks.com/Lessons/web/basics/printing,htm, Feb. 10, 2003.
Steel-Belted Radius/Enterprise Edition, Funk Software, Inc., 2004.
Stephanidis, Constantine et al., "Design Representations and Development Support for User Interface Adaptation," Institute of Computer Science Foundation for Research and Technology, 1995.
The Basics of the Browser, Santa Clara County Office of Education Internet Institutue (SCCOE), 1999.
The Business Intelligence Industry's Leading Products and Services, Business Objects, 2001.
The Sagent Analytic Advantage, Sagent Technology Inc., May 2002.
The Sagent Performance Story, Sagent Technology, Inc., Oct. 2001.
Tsai, Michael, "The Personal Computing Paradigm," ATPM Inc., 1998.
Ünal, A., "Electronic Commerce and Multi-enterprise Supply/Value/Business Chains," Information Sciences, Aug. 2000, pp. 63-68, vol. 127, Issues 1-2, NH Elsevier.
Using Microsoft Excel 97 Manual. Bestseller Edition. Que Corporation, 1997.
Wang, Wenjie et al., "Instant Messaging Insight," Computer Science Department, New York Unuversity, Nov. 22, 2000.
Watson, Hugh J., "Recent Developments in Data Warehousing," Communications of the Association for Information Systems, pp. 1-25, vol. 8, 2001.

Weiss, Aaron, "The Document Object Model Dissected," Jupitermedia Corporation, 2002.

Woods, Bob, "CypherGuard Secures MSN, Windows IM," JupiterMedia Corporation, Oct. 3, 2002.

X Window System: Getting Started, Stanford University, Oct. 26, 2000.

Office Action for U.S. Appl. No. 10/237,559, dated Feb. 1, 2008, 12 pages total.

Office Action for U.S. Appl. No. 10/289,155, dated Jan. 29, 2008, 14 pages total.

Office Action for U.S. Appl. No. 10/289,155, dated Jul. 28, 2008, 10 pages total.

Office Action for U.S. Appl. No. 10/289,162, dated Nov. 30, 2007, 12 pages total.

Office Action of U.S. Appl. No. 10/289,231, dated Nov. 6, 2008, 10 pages total.

Office Action of U.S. Appl. No. 10/289,231 dated Apr. 30, 2009, 10 pages total.

Office Action for U.S. Appl. No. 10/390,978, dated Mar. 5, 2009, 19 pages total.

Office Action for U.S. Appl. No. 10/390,978, dated Sep. 4, 2009, 24 pages total.

Office Action for U.S. Appl. No. 10/391,073, dated Jan. 4, 2008, 8 pages total.

Office Action for U.S. Appl. No. 10/391,073, dated Sep. 12, 2008, 9 pages total.

Office Action for U.S. Appl. No. 10/391,073, dated Feb. 12, 2009, 8 pages total.

Office Action for U.S. Appl. No. 10/391,073, dated Jul. 30, 2009, 9 pages total.

Advisory Action for U.S. Appl. No. 10/391,073, dated Sep. 18, 2009, 3 pages total.

Office Action for U.S. Appl. No. 10/391,128, dated Oct. 6, 2008, 19 pages total.

Office Action for U.S. Appl. No. 10/391,128, dated May 13, 2009, 18 pages total.

Office Action for U.S. Appl. No. 10/391,128, dated Oct. 27, 2009, 19 pages total.

Office Action for U.S. Appl. No. 10/391,544, dated Sep. 17, 2008, 14 pages total.

Office Action for U.S. Appl. No. 10/391,544, dated Aug. 28, 2009, 17 pages total.

Anton, Jesse et al., "Web Catching for Database Applications with Oracle Cache", Jun. 4-6, 2002, pp. 594-599.

Office Action for U.S. Appl. No. 10/390,978, dated Sep. 1, 2005, 15 pages total.

Final Office Action for U.S. Appl. No. 10/390,978, dated May 18, 2006, 13 pages total.

Office Action for U.S. Appl. No. 10/390,978, dated Feb. 21, 2007, 16 pages total.

Final Office Action for U.S. Appl. No. 10/390,978, dated Jun. 25, 2007, 17 pages total.

Office Action for U.S. Appl. No. 10/390,978, dated Jan. 9, 2008, 5 pages total.

Final Office Action for U.S. Appl. No. 10/390,978, dated Sep. 3, 2008, 17 pages total.

Advisory Action for U.S. Appl. No. 10/390,978, dated Nov. 3, 2008, 3 pages total.

Final Office Action for U.S. Appl. No. 10/390,978, dated Sep. 4, 2009, 24 pages total.

Office Action for U.S. Appl. No. 10/390,978, dated Dec. 14, 2009, 25 pages total.

Office Action of U.S. Appl. No. 10/289,231, dated Dec. 9, 2005, 17 pages total.

Final Office Action of U.S. Appl. No. 10/289,231, dated Apr. 11, 2006, 15 pages total.

Office Action of U.S. Appl. No. 10/289,231, dated Nov. 30, 2006, 13 pages total.

Final Office Action of U.S. Appl. No. 10/289,231, dated Apr. 16, 2007, 15 pages total.

Office Action of U.S. Appl. No. 10/289,231, dated Apr. 15, 2008, 12 pages total.

Final Office Action of U.S. Appl. No. 10/289,231, dated Dec. 14, 2009, 9 pages total.

Office Action for U.S. Appl. No. 10/289,155, dated May 18, 2006; 11 pages total.

Final Office Action for U.S. Appl. No. 10/289,155, dated Mar. 27, 2007; 12 pages total.

Advisory Action for U.S. Appl. No. 10/289,155, dated May 31, 2007; 3 pages total.

Office Action for U.S. Appl. No. 10/289,155, dated Aug. 6, 2007; 11 pages total.

Advisory Action for U.S. Appl. No. 10/289,155, dated Apr. 14, 2008; 3 pages total.

Final Office Action for U.S. Appl. No. 10/289,155, dated Jan. 6, 2009; 11 pages total.

Notice of Allowance for U.S. Appl. No. 10/289,155, dated Jun. 11, 2009; 9 pages total.

Notice of Allowance for U.S. Appl. No. 10/289,155, dated Sep. 29, 2009; 7 pages total.

Office Action for U.S. Appl. No. 10/391,128, dated Jul. 20, 2007, 9 pages total.

Final Office Action for U.S. Appl. No. 10/391,128, dated Mar. 19, 2008, 12 pages total.

Advisory Action for U.S. Appl. No. 10/391,128, dated Jul. 21, 2008, 3 pages total.

Advisory Action for U.S. Appl. No. 10/391,128, dated Jul. 20, 2009, 3 pages total.

Office Action for U.S. Appl. No. 10/391,544, dated Sep. 8, 2006, 12 pages total.

Advisory Action for U.S. Appl. No. 10/391,544, dated Dec. 3, 2008, 6 pages total.

Office Action for U.S. Appl. No. 10/391,544, dated Feb. 3, 2009, 16 pages total.

Advisory Action for U.S. Appl. No. 10/391,544, dated Dec. 11, 2009, 2 pages total.

Notice of Allowance for U.S. Appl. No. 10/391,544, dated Mar. 25, 2010, 12 pages total.

Office Action for U.S. Appl. No. 10/452,665, dated Dec. 7, 2006, 8 pages total.

Final Office Action for U.S. Appl. No. 10/452,665, dated May 9, 2007, 7 pages total.

Office Action for U.S. Appl. No. 10/391,073, dated Feb. 8, 2007; 7 pages total.

Final Office Action for U.S. Appl. No. 10/391,073, dated Jun. 21, 2007; 7 pages total.

Advisory Action for U.S. Appl. No. 10/391,073, dated Oct. 28, 2008; 3 pages total.

Office Action for U.S. Appl. No. 10/391,073, dated Jan. 19, 2010; 9 pages total.

Office Action for U.S. Appl. No. 11/763,134, dated Jun. 3, 2010; 21 pages total.

Office Action for U.S. Appl. No. 10/289,231, dated Apr. 12, 2010, 12 pgs.

Office Action for U.S. Appl. No. 10/390,978, dated Jun. 17, 2010, 28 pgs.

Final Office Action for U.S. Appl. No. 10/391,073, dated Jun. 17, 2010; 9 pgs.

Advisory Action for U.S. Appl. No. 10/391,073, dated Aug. 23, 2010; 2 pgs.

Office Action for U.S. Appl. No. 10/391,128, dated Oct. 27, 2009, 20 pages total.

Final Office Action for U.S. Appl. No. 10/391,128, dated Jul. 7, 2010, 25 pages total.

Notice of Allowance for U.S. Appl. No. 10/391,544, dated Aug. 13, 2010, 10 pages total.

Final Office Action for U.S. Appl. No. 10/390,978, dated Jun. 17, 2010, 28 pages total.

Office Action of U.S. Appl. No. 10/289,139 dated Dec. 9, 2005, 14 pages total.

Final Office Action of U.S. Appl. No. 10/289,139 dated Apr. 11, 2006, 16 pages total.

Office Action of U.S. Appl. No. 10/289,139 dated Nov. 30, 2006, 14 pages total.

Notice of Allowance of U.S. Appl. No. 10/289,139 dated May 1, 2007, 6 pages total.
Office Action of U.S. Appl. No. 10/289,142 dated Dec. 20, 2005, 9 pages total.
Final Office Action of U.S. Appl. No. 10/289,142 dated Apr. 24, 2006, 12 pages total.
Office Action of U.S. Appl. No. 10/289,142 dated Dec. 4, 2006, 9 pages total.
Final Office Action of U.S. Appl. No. 10/289,142 dated May 30, 2007, 10 pages total.
Notice of Allowance of U.S. Appl. No. 10/289,142 dated Jan. 4, 2008, 9 pages total.
Notice of Allowance of U.S. Appl. No. 10/289,142 dated May 2, 2008, 5 pages total.
Office Action of U.S. Appl. No. 10/390,945 dated Feb. 9, 2007, 8 pages total.
Final Office Action of U.S. Appl. No. 10/390,945 dated Jul. 5, 2007, 9 pages total.
Notice of Allowance of U.S. Appl. No. 10/390,945 dated Jan. 9, 2008, 7 pages total.
Notice of Allowance of U.S. Appl. No. 10/390,945 dated Jun. 9, 2008, 7 pages total.
Office Action of U.S. Appl. No. 10/289,162 dated Dec. 21, 2005, 12 pages total.
Final Office Action of U.S. Appl. No. 10/289,162 dated Apr. 20, 2007, 8 pages total.
Notice of Allowance of U.S. Appl. No. 10/289,162 dated Nov. 30, 2007, 12 pages total.
Notice of Allowance of U.S. Appl. No. 10/289,162 dated Apr. 16, 2008, 17 pages total.
Office Action of U.S. Appl. No. 12/039,471 dated Dec. 11, 2009, 13 pages total.
Final Office Action of U.S. Appl. No. 12/039,471 dated Jun. 24, 2010, 20 pages total.
Advisory Action of U.S. Appl. No. 12/039,471 dated Sep. 8, 2010, 2 pages total.
Office Action of U.S. Appl. No. 10/237,559 dated Jan. 31, 2005, 11 pages total.
Office Action of U.S. Appl. No. 10/237,559 dated Aug. 8, 2005, 11 pages total.
Final Office Action of U.S. Appl. No. 10/237,559 dated Dec. 30, 2005, 10 pages total.
Office Action of U.S. Appl. No. 10/237,559 dated Jan. 11, 2007, 10 pages total.
Final Office Action of U.S. Appl. No. 10/237,559 dated Aug. 15, 2007, 13 pages total.
Advisory Action of U.S. Appl. No. 10/237,559 dated Oct. 25, 2007, 3 pages total.
Office Action of U.S. Appl. No. 10/237,559 dated Feb. 1, 2008, 12 pages total.
Notice of Allowance of U.S. Appl. No. 10/237,559 dated Aug. 21, 2008, 9 pages total.
Office Action of U.S. Appl. No. 12/035,376 dated Sep. 15, 2010, 9 pages total.
Office Action for U.S. Appl. No. 10/289,231: Notice of Allowance mailed Nov. 5, 2010, 9 pages.
Office Action for U.S. Appl. No. 11/763,134: Final Office Action mailed Nov. 24, 2010, 25 pages.
Office Action for U.S. Appl. No. 10/391,073: Notice of Allowance mailed Oct. 27, 2010, 10 pages.
Notice of Allowance for U.S. Appl. No. 12/035,376 mailed Mar. 18, 2011, 6 pages.
Notice of Allowance for U.S. Appl. No. 10/391,544 mailed Oct. 28, 2010, 5 pages.
Office Action of U.S. Appl. No. 12/039,471 mailed Mar. 31, 2011, 19 pages.
Notice of Allowance for U.S. Appl. No. 12/035,376, mailed Jan. 25, 2011, 8 pages.
Notice of Allowance for U.S. Appl. No. 10/391,128, mailed Dec. 30, 2010, 3 pages.
Notice of Allowance for U.S. Appl. No. 10/390,978, mailed Jan. 4, 2011, 4 pages.

U.S. Appl. No. 12/039,471, filed Feb. 28 2008, Final Office Action mailed Oct. 3, 2011, 20 pages.
U.S. Appl. No. 13/079,436, filed Apr. 4, 2011.
U.S. Appl. No. 11/763,134, filed Jun. 14, 2007.
U.S. Appl. No. 10/452,665, filed May 30, 2003.
U.S. Appl. No. 12/039,471, filed Feb. 28, 2008.
U.S. Appl. No. 10/289,139, Dec. 9, 2005, Non-Final Office Action.
U.S. Appl. No. 10/289,139, Nov. 30, 2006, Non-Final Office Action.
U.S. Appl. No. 10/289,139, Apr. 11, 2006, Final Office Action.
U.S. Appl. No. 10/289,139, May 1, 2007, Notice of Allowance.
U.S. Appl. No. 10/289,231, Dec. 9, 2005, Non-Final Office Action.
U.S. Appl. No. 10/289,231, Nov. 30, 2006, Non-Final Office Action.
U.S. Appl. No. 10/289,231, Apr. 15, 2008, Non-Final Office Action.
U.S. Appl. No. 10/289,231, Apr. 30, 2009, Non-Final Office Action.
U.S. Appl. No. 10/289,231, Apr. 12, 2010, Non-Final Office Action.
U.S. Appl. No. 10/289,231, Apr. 11, 2006, Final Office Action.
U.S. Appl. No. 10/289,231, Apr. 16, 2007, Final Office Action.
U.S. Appl. No. 10/289,231, Nov. 6, 2008, Final Office Action.
U.S. Appl. No. 10/289,231, Dec. 14, 2009, Final Office Action.
U.S. Appl. No. 10/289,231, Nov. 5, 2010, Notice of Allowance.
U.S. Appl. No. 10/289,155, May 31, 2007, Advisor Action.
U.S. Appl. No. 10/289,155, Apr. 14, 2008, Advisory Action.
U.S. Appl. No. 10/289,155, May 18, 2006, Non-Final Office Action.
U.S. Appl. No. 10/289,155, Aug. 6, 2007, Non-Final Office Action.
U.S. Appl. No. 10/289,155, Jul. 28, 2008, Non-Final Office Action.
U.S. Appl. No. 10/289,155, Mar. 27, 2007, Final Office Action.
U.S. Appl. No. 10/289,155, Jan. 29, 2008, Final Office Action.
U.S. Appl. No. 10/289,155, Jan. 6, 2009, Final Office Action.
U.S. Appl. No. 10/289,155, Jun. 11, 2009, Notice of Allowance.
U.S. Appl. No. 10/289,155, Sep. 29, 2009, Notice of Allowance.
U.S. Appl. No. 10/289,142, Dec. 20, 2005, Non-Final Office Action.
U.S. Appl. No. 10/289,142, Dec. 4, 2006, Non-Final Office Action.
U.S. Appl. No. 10/289,142, Apr. 24, 2006, Final Office Action.
U.S. Appl. No. 10/289,142, May 30, 2007, Final Office Action.
U.S. Appl. No. 10/289,142, Jan. 4, 2008, Notice of Allowance.
U.S. Appl. No. 10/289,142, May 2, 2008, Notice of Allowance.
U.S. Appl. No. 12/035,376, Sep. 15, 2010, Non-Final Office Action.
U.S. Appl. No. 12/035,376, Jan. 25, 2011, Notice of Allowance.
U.S. Appl. No. 12/035,376, Mar. 18, 2011, Notice of Allowance.
U.S. Appl. No. 10/391,128, Jul. 21, 2008, Advisory Action.
U.S. Appl. No. 10/391,128, Jul. 20, 2009, Advisory Action.
U.S. Appl. No. 10/391,128, Sep. 23, 2010, Advisory Action.
U.S. Appl. No. 10/391,128, Jul. 20, 2007, Non-Final Office Action.
U.S. Appl. No. 10/391,128, Oct. 6, 2008, Non-Final Office Action.
U.S. Appl. No. 10/391,128, Oct. 27, 2009, Non-Final Office Action.
U.S. Appl. No. 10/391,128, Mar. 19, 2008, Final Office Action.
U.S. Appl. No. 10/391,128, May 13, 2009, Final Office Action.
U.S. Appl. No. 10/391,128, Jul. 7, 2010, Final Office Action.
U.S. Appl. No. 10/391,128, Dec. 30, 2010, Notice of Allowance.
U.S. Appl. No. 10/390,945, Feb. 9, 2007, Non-Final Office Action.
U.S. Appl. No. 10/390,945, Jul. 5, 2007, Final Office Action.
U.S. Appl. No. 10/390,945, Jan. 9, 2008, Notice of Allowance.
U.S. Appl. No. 10/390,945, Jun. 9, 2008, Notice of Allowance.
U.S. Appl. No. 10/390,978, Nov. 3, 2008, Advisory Action.
U.S. Appl. No. 10/390,978, Sep. 1, 2005, Non-Final Office Action.
U.S. Appl. No. 10/390,978, Feb. 21, 2007, Non-Final Office Action.
U.S. Appl. No. 10/390,978, Jan. 9, 2008, Non-Final Office Action.
U.S. Appl. No. 10/390,978, Mar. 5, 2009, Non-Final Office Action.
U.S. Appl. No. 10/390,978, Dec. 14, 2009, Non-Final Office Action.
U.S. Appl. No. 10/390,978, May 18, 2006, Final Office Action.
U.S. Appl. No. 10/390,978, Jun. 25, 2007, Final Office Action.
U.S. Appl. No. 10/390,978, Sep. 3, 2008, Final Office Action.
U.S. Appl. No. 10/390,978, Sep. 4, 2009, Final Office Action.
U.S. Appl. No. 10/390,978, Jun. 17, 2010, Final Office Action.
U.S. Appl. No. 10/390,978, Jan. 4, 2011, Notice of Allowance.
U.S. Appl. No. 10/391,544, Dec. 3, 2008, Advisory Action.
U.S. Appl. No. 10/391,544, Dec. 11, 2009, Advisory Action.
U.S. Appl. No. 10/391,544, Sep. 8, 2006, Non-Final Office Action.
U.S. Appl. No. 10/391,544, Feb. 3, 2009, Non-Final Office Action.
U.S. Appl. No. 10/391,544, Sep. 17, 2008, Final Office Action.
U.S. Appl. No. 10/391,544, Aug. 28, 2009, Final Office Action.
U.S. Appl. No. 10/391,544, Mar. 25, 2010, Notice of Allowance.
U.S. Appl. No. 10/391,544, Aug. 13, 2010, Notice of Allowance.

U.S. Appl. No. 10/391,544, Oct. 28, 2010, Notice of Allowance.
U.S. Appl. No. 11/763,134, Jun. 3, 2010, Non-Final Office Action.
U.S. Appl. No. 11/763,134, Nov. 24, 2010, Final Office Action.
U.S. Appl. No. 10/452,665, Dec. 7, 2006, Non-Final Office Action.
U.S. Appl. No. 10/452,665, May 9, 2007, Final Office Action.
U.S. Appl. No. 10/289,162, Dec. 21, 2005, Non-Final Office Action.
U.S. Appl. No. 10/289,162, Apr. 20, 2007, Final Office Action.
U.S. Appl. No. 10/289,162, Nov. 30, 2007, Notice of Allowance.
U.S. Appl. No. 10/289,162, Apr. 16, 2008, Notice of Allowance.
U.S. Appl. No. 12/039,471, Sep. 8, 2010, Advisory Action.
U.S. Appl. No. 12/039,471, Jun. 24, 2010, Final Office Action.
U.S. Appl. No. 12/039,471, Oct. 3, 2011, Final Office Action.
U.S. Appl. No. 12/039,471, Dec. 11, 2009, Non-Final Office Action.
U.S. Appl. No. 12/039,471, Mar. 31, 2011, Non-Final Office Action.
U.S. Appl. No. 10/237,559, Oct. 25, 2007, Advisory Action.
U.S. Appl. No. 10/237,559, Jan. 31, 2005, Non-Final Office Action.
U.S. Appl. No. 10/237,559, Aug. 8, 2005, Non-Final Office Action.
U.S. Appl. No. 10/237,559, Jan. 11, 2007, Non-Final Office Action.
U.S. Appl. No. 10/237,559, Feb. 1, 2008, Non-Final Office Action.
U.S. Appl. No. 10/237,559, Dec. 30, 2005, Final Office Action.
U.S. Appl. No. 10/237,559, Aug. 15, 2007, Final Office Action.
U.S. Appl. No. 10/237,559, Aug. 21, 2008, Notice of Allowance.
U.S. Appl. No. 10/391,073, Oct. 28, 2008, Advisory Action.
U.S. Appl. No. 10/391,073, Sep. 18, 2009, Advisory Action.
U.S. Appl. No. 10/391,073, Aug. 23, 2010, Advisory Action.
U.S. Appl. No. 10/391,073, Feb. 8, 2007, Non-Final Office Action.
U.S. Appl. No. 10/391,073, Jan. 4, 2008, Non-Final Office Action.
U.S. Appl. No. 10/391,073, Sep. 12, 2008, Non-Final Office Action.
U.S. Appl. No. 10/391,073, Feb. 12, 2009, Non-Final Office Action.
U.S. Appl. No. 10/391,073, Jan. 19, 2010, Non-Final Office Action.
U.S. Appl. No. 10/391,073, Jun. 21, 2007, Final Office Action.
U.S. Appl. No. 10/391,073, Sep. 12, 2008, Final Office Action.
U.S. Appl. No. 10/391,073, Jul. 30, 2009, Final Office Action.
U.S. Appl. No. 10/391,073, Jun. 17, 2010, Final Office Action.
U.S. Appl. No. 10/391,073, Oct. 27, 2010, Notice of Allowance.

* cited by examiner

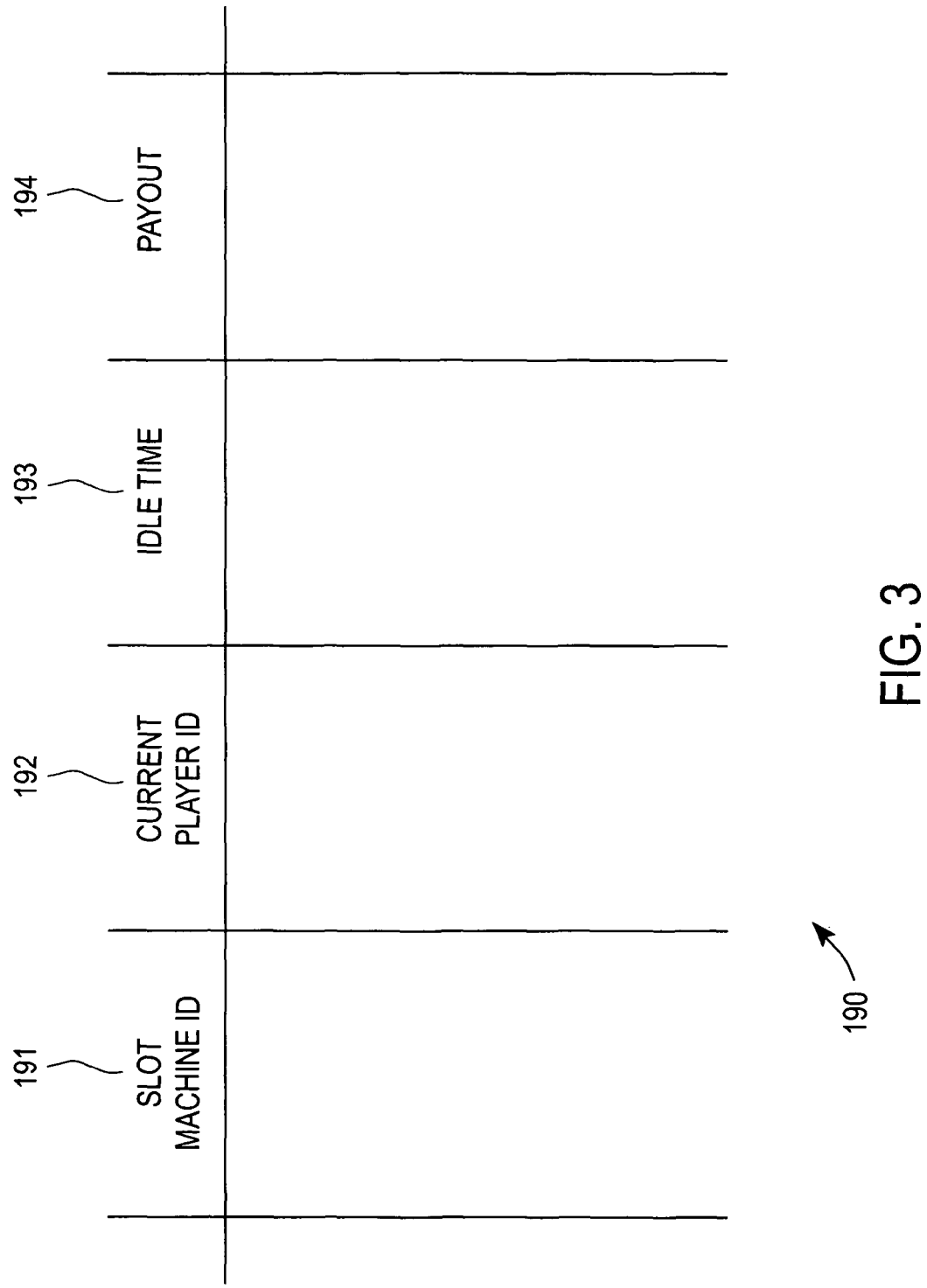

BUSINESS INTELLIGENCE SYSTEM WITH INTERFACE THAT PROVIDES FOR IMMEDIATE USER ACTION

RELATED APPLICATIONS

This application is a continuation-in-part of, and claims priority to, U.S. application Ser. 10/237,559 entitled "Enterprise Link For a Software Database," filed on Sep. 6, 2002 now U.S. Pat. No. 7,454,423, which is incorporated herein by reference.

FIELD OF THE INVENTION

The present invention relates generally to information technology in a business enterprise; more specifically, to systems and methods that provide real-time delivery of business intelligence information and a platform for resolving business problems as they arise.

BACKGROUND OF THE INVENTION

A paramount concern in a modern enterprise is the ability to quickly access changing information located on disparate systems and platforms within the enterprise. That is, operational managers and executives frequently require real-time visibility into the status of their operations and enterprise processes. In order to properly maintain a comprehensive view of the operations and business processes within an organization, however, information on these systems first needs to be integrated. As an enterprise grows it requires increased flexibility of data sharing throughout its various automated business systems, such as customer relationship management (CRM), enterprise resource planning (ERP), accounting, inventory control, and other systems. A practice known as enterprise application integration (EAI) enables an organization to share data throughout applications and data sources in an organization. EAI may include database linking, application linking, and data warehousing.

Nevertheless, there have been numerous shortcomings in the integration and data sharing in information technology (IT) environments. Independent configuration for disparate technologies and industry standards often make integration requirements difficult to meet. Integrating an existing inventory control system to a new ERP software package, for instance, may be difficult due to the fact that both systems contain unique features that are customized to fit the requirements of particular areas within an organization. Moreover, many EAI solutions contain a confusing web of point-to-point connections between different applications, procedure calls, file transfers, and e-mail-type messaging to transmit organizational data. These solutions are thus high-risk because of their complexity. Moreover, the data within the individual systems is often locked up, sometimes in proprietary form, difficult to access, and not correlated with other systems and platforms. This makes it difficult to obtain a consistent, coherent view of all the business data across the enterprise.

Business intelligence (BI) systems have been developed that combine data gathering, data storage, and knowledge management with analytical tools to present complex and competitive information to planners and decision makers. Many conventional business intelligence systems include modules and programs that provide visual reporting of information regarding the status and operation of business processes in a full-page display panel known as a "dashboard". By way of example, Syspro™ Company of Costa Mesa, Calif. offers a CRM software product that includes an intuitive dashboard for displaying BI information gathered from various business activity groups (marketing, service, sales, accounting, etc.). A system in which an online connection provider delivers services to sellers via a dashboard report that includes metrics such as item sales, top-line highlights, and an executive summary, is described in U.S. Patent Publication 2005/0197946. Additionally, U.S. Patent Publication 2005/0108655 teaches a computer method for displaying multiple applications at a time on a window browser or dashboard display area. U.S. Patent Publication 2005/0120051 discloses an architecture and system for integrating online transactional processing (OLTP) systems with an analytical processing (OLAP) system. A user interface presentation layer of the architecture is configured for dashboard display of a report run on the OTLP and OLAP data.

A primary drawback of these prior art systems is that they require separate applications or systems for reporting the BI information on the dashboard screen, and then taking direct action based on the data displayed. For example, an operational manager who first learns of a problem based on information presented in a dashboard report is typically required to switch to a completely different application or system in order to take action aimed at correcting or alleviating the problem.

What is needed therefore is an enterprise system that enables a viewer of a real-time business activity monitoring dashboard to take immediate action from the dashboard environment without having to employ a separate system or application.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 3 is an example of data stored in tabular form in an active data cache according to one embodiment of the present invention.

DETAILED DESCRIPTION

The present invention provides a business intelligence system and method that allows a viewer of a real-time dashboard display or report to take immediate action directly from the dashboard environment (i.e., on the screen where the data is being displayed). In the following description numerous specific details are set forth, such as the particular configurations, data acquisition methods, and architectural details of specific embodiments in order to provide a thorough understanding of the present invention. However, persons having ordinary skill in the communication arts will appreciate that these specific details may not be needed to practice the present invention.

Practitioners in the arts will understand that specific implementations of the systems and component elements described in the present application can be realized in digital electronic circuitry, integrated circuitry, application specific integrated circuits (ASICs), computer hardware, firmware, software, and/or combinations thereof. Computer software or firmware code is typically executed on a programmable data processor that comprises a number of basic subsystems including a processor subsystem, a main memory and an input/output (I/O) subsystem. Data is transferred between main memory ("system memory") and processor subsystem over a memory bus, and between the processor and I/O subsystems over a system bus. Examples of the system bus may include the conventional lightning data transport (or hyper transport) bus and the conventional peripheral component [computer] interconnect (PCI) bus. Each computer node may also comprise other hardware units/modules coupled to the system bus for performing additional functions. The processor subsystem may comprise one or more processors and a controller device that incorporates a set of functions including a system memory controller, support for one or more system buses and direct memory access (DMA) engines.

Additionally, to provide the user interface described below, the systems and techniques described here can be implemented on a computer having a display device (e.g., a cathode ray tube or liquid crystal display monitor) for displaying information to the user, and a user input device such as a keyboard and/or a cursor device (e.g., a mouse, a touchpad, or a trackball). Input commands may also be applied through the use of known speech recognition tools. Other kinds of devices can be used to provide data and sensory feedback information to the user as well; for example, visual feedback, auditory feedback, or tactile feedback.

Figure 1:
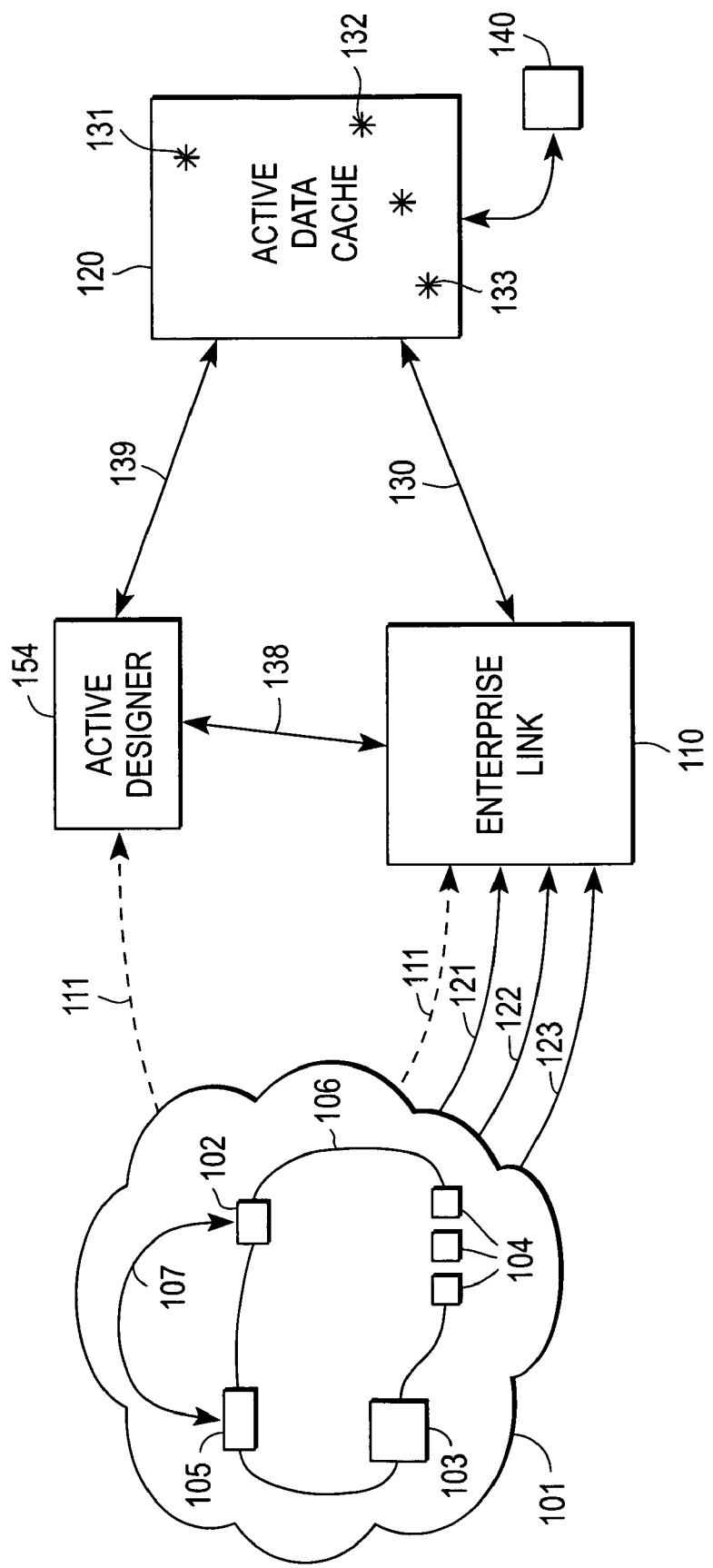
FIG. 1 is a block diagram of an enterprise system according to one embodiment of the present invention.

Referring now to FIG. 1 there is shown a block diagram of a message-based, event-driven, memory-resident architecture utilized in accordance with one embodiment of the present invention. Included in FIG. 1 is an enterprise computing runtime environment 101 that may comprise single-purpose and/or multi-purpose applications designed to perform various functions within an organization (e.g., inventory, finance, accounting, sales force automation, human resources, etc.). The components of the system can be interconnected by any form or medium of digital data communication (e.g., a communication network). Examples of communication networks include a local area network ("LAN"), a wide area network ("WAN"), and the Internet.

In the example of FIG. 1, enterprise computing runtime environment 101 is shown including a plurality of software applications such as "back office" applications 102 for enterprise resource planning (ERP), "front-office" applications 103 for customer relationship management (CRM), customized legacy systems 104, and multi-dimensional/relational database management systems (RDBMS) 105. Enterprise computing runtime environment 101 may also include various known applications or external systems. Each of these disparate applications/systems may be coupled to one another using a local area network (LAN) 106, a wide area network (WAN) or any other such networking environments commonplace in offices, enterprise-wide computer networks, the intranet, and the Internet. Furthermore, the systems may be connected via a wireless network, e.g., a wireless LAN.

The enterprise systems that comprise enterprise environment 101 generate/store a variety of different data about the organization. For example, ERP system 102 may contain data regarding essential business functions including payroll, manufacturing, general ledger, and human resources, whereas CRM system 103 may contain core information regarding the organization's customers. As data in these various systems changes (e.g., a sale is made, a new employee is hired, payroll is processed, etc.), one or more message queuing systems 107 may be used to allow these various applications 102, 103, 104, etc., to exchange information on the data being stored in their systems. By way of example, in one implementation a Microsoft® message Queue Server (MSMQ) is utilized for this purpose. Other message queuing systems may be used as well. In MSMQ, messages are sent to a queue where they stay until removed and/or used by another application.

Included in the architecture of FIG. 1 is an enterprise link 110 coupled to enterprise computing runtime environment 101 through a network connection, such as the Internet 111. As is noted above, other network connections such as a LAN, a WAN, a wireless network, or any other system of connections that allow one or more computers to exchange information may also be utilized. Enterprise link 110 is a data integration engine that integrates, in real-time (i.e., several seconds) the disparate data in the message queues. Enterprise link 110 operates continuously to move, transform and load source data into an active data cache 120. That is, enterprise link 110 continuously accepts raw data feeds (121, 122, 123, etc.) from the enterprise systems of environment 101, and then reformats, synchronizes, and consolidates the data.

In a traditional model, the data in the message queues would only be processed through the dataflow system when a specified number of records had built up within the message queues (i.e., the data would be transmitted in batch mode). According to an algorithm contained within the data flow system of the present invention, however, individual records are processed through to enterprise link 110 the moment that they appear (i.e., the program actively and continuously checks for messages). In this manner, real-time data flow is transmitted through the raw data feeds 121, 122, 123 via the message queues. Enterprise link 110 may also obtain raw data from enterprise computing runtime environment 101 in a variety of other ways. The data sources may include HyperText Transport Protocol ("HTTP") requests, Application Programming Interface ("API") calls, or Web Services calls. Source data can also be retrieved from transactional systems, data warehouses, operational data stores, database servers, mainframe-based flat files, and Extensible Mark-up Language (XML) sources. In an alternative embodiment, enterprise link 110 may include a web server to process HTTP requests and/or another application or server to process API and/or Web Service calls.

In addition to the above data sources, enterprise link 110 can draw historical data from conventional data warehouses via relational queries. This capability allows the business activity monitoring architecture of the present invention to generate alerts based on comparisons between real-time data and rolling averages or other historically derived thresholds.

Regardless of how the enterprise link 110 receives the raw data feeds 121, 122, 123, etc., or which source it is received from, enterprise link 110 transmits the integrated data to active data cache (ADC) 120 via a network connection 130. In one embodiment, ADC 120 is a high-performance, persistent, transacted, memory-based storage system that supports active data and monitoring. This active data, organized in the form in which the end user wishes to see it, is the data 131, 132, 133, etc., extracted from the enterprise systems of environment 101 by enterprise link 110. ADC 120 contains code which may be implemented in software such as Java™, Perl, C++, or other types of programming languages that can be stored on a computer-readable medium (e.g., a disk) to manage the data 131, 132, 133, etc., that is actively changing within enterprise computing runtime environment 101 and to make the data accessible to the end user in real-time. In this way, the data 131, 132, 133, etc., in ADC 120 is constantly changing such that it is synchronized in real-time with the data in enterprise runtime computing environment 101. (It should be understood that in the context of the present application, the term "real-time" refers to the fact that enterprise information is extracted from various sources, integrated, stored, and streamed to a graphical display for viewing by a user within 2-10 seconds from the occurrence of an enterprise event.)

FIG. 1 also shows the data 131, 132, 133, etc., in ADC 120 may be persisted to disk 140 for backup, restore, and recovery purposes.

The architecture of FIG. 1 further includes an active designer component 154 that determines what data is stored within, and the process by which the data 131, 132, 133, etc., is transmitted to, ADC 120. Active designer component 154 is shown connected to enterprise computing runtime environment 101 via the Internet 111, and with ADC 120 via a network connection 139. In essence, active designer component 154 contains one or more lists of data flow definitions or plans on how to operate on the data that is transmitted to active data cache 120 via enterprise link 110. In one implementation, active designer component 154 provides a user interface that allows an architect to create data objects, create and schedule data flow definitions, import and create metadata, and maintain the data objects. The code for the data flow definitions may be implemented in software such as JAVA, Perl, C++, C#, or other types of programming languages that can be stored on a computer-readable medium.

To better understand this aspect of the architecture shown in FIG. 1, when sales data arrives at ERP 102, active designer component 154 contains a set of data flow definitions on how to retrieve, transform, and display this data (i.e., each data flow definition includes executable software code instructing enterprise link 110 to retrieve the salesperson field whenever a sale is made, to describe how many sales that salesperson has made for the day, and then to transmit this data to the ADC 120). The mapping process by which the enterprise link 110 is able to express data from multiple sources through various transformations and to transmit the transformed data to specified destinations is described in more detail with reference to FIG. 2A below.

Figure 2A:
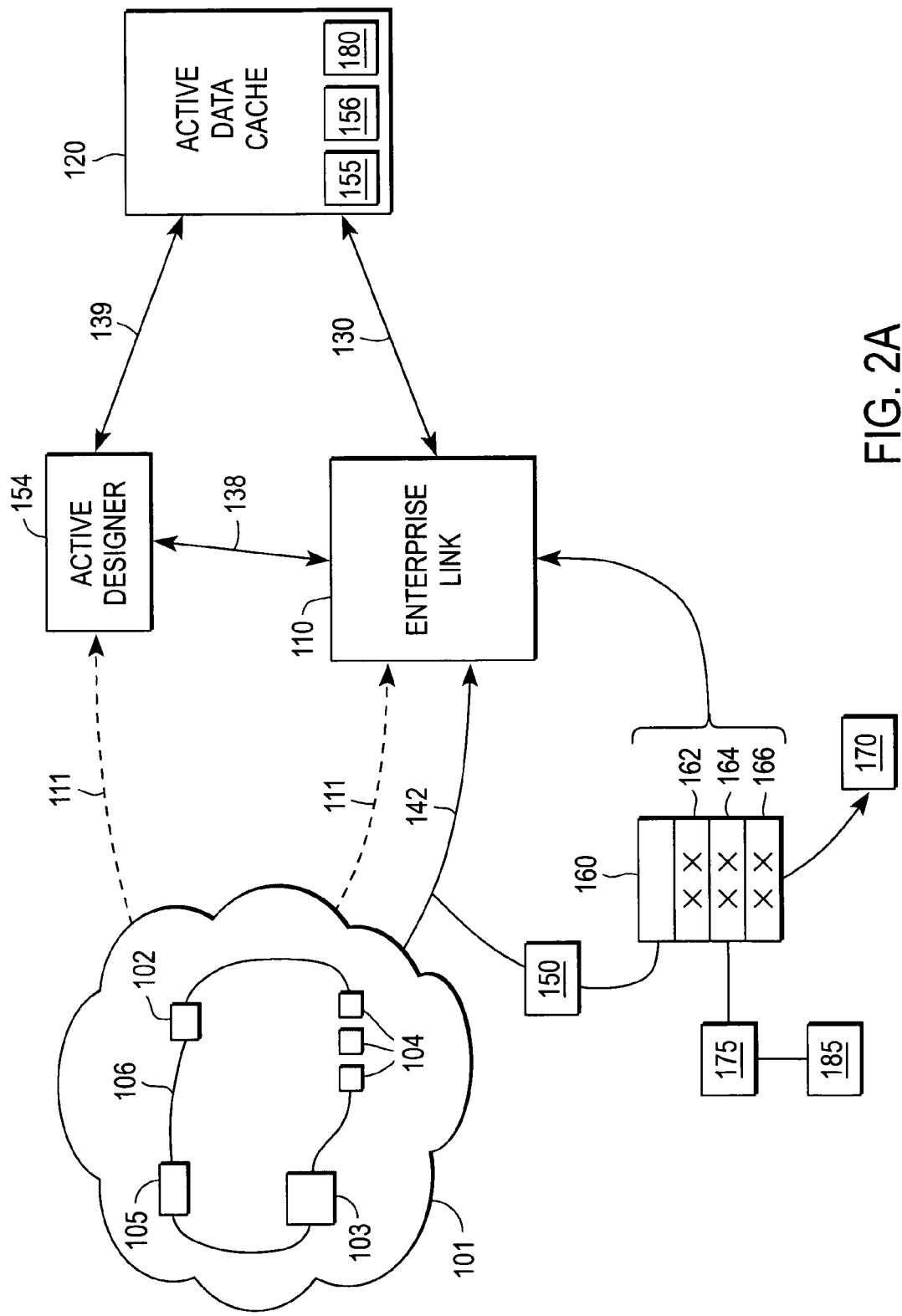
FIG. 2A is a block diagram of message queue processing using the enterprise link of FIG. 1.
Figure 2B:
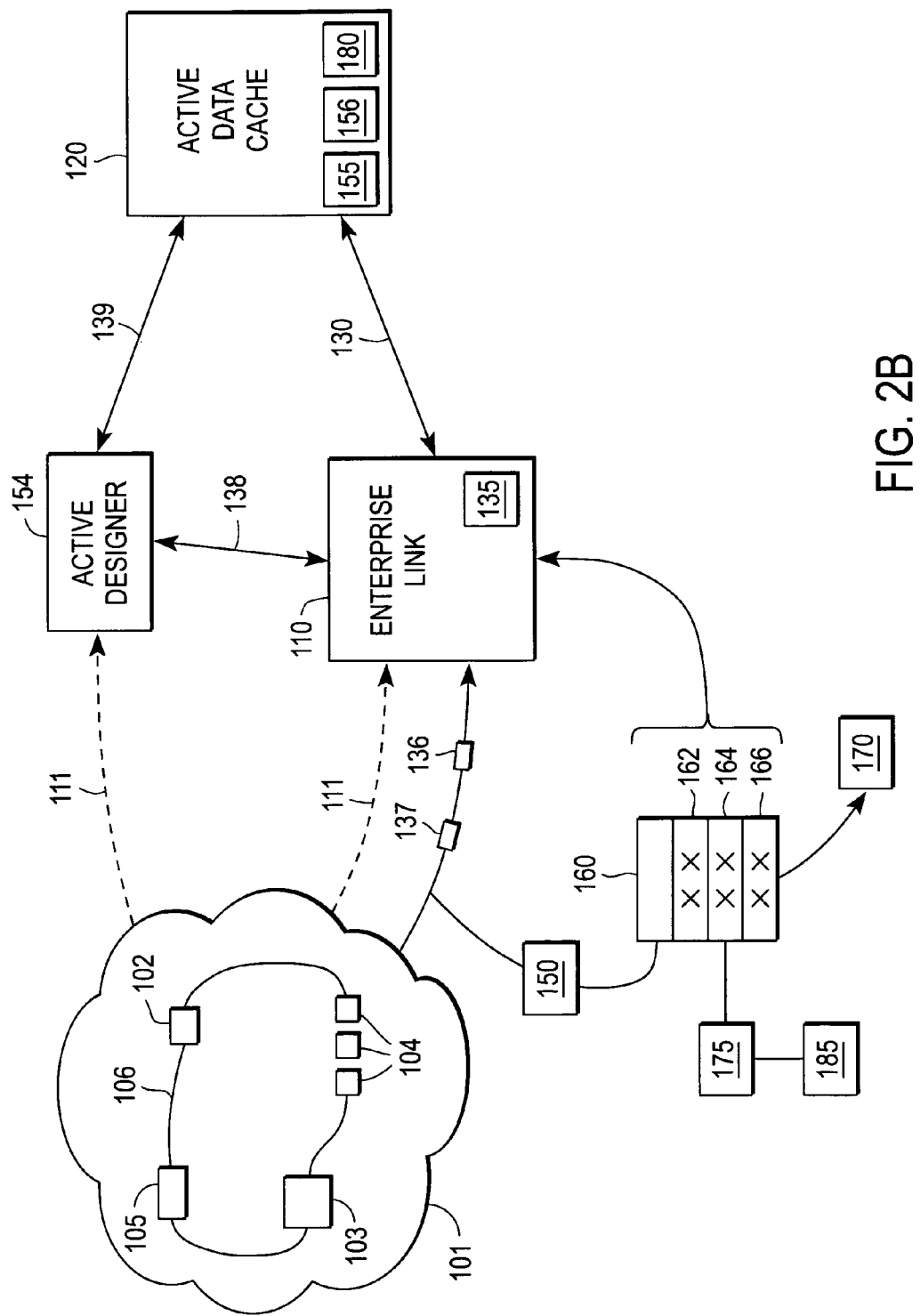
FIG. 2B is a block diagram of a HTTP and API data request processing using the enterprise link of FIG. 1.

FIG. 2A is a high-level block diagram of the message queue processing system described above in conjunction with FIG. 1. As data changes in the plurality of enterprise systems in environment 101, raw data is sent to enterprise link 110 in data feeds through message queues 142. The data that comes through the message queues 142 may come from disparate sources (e.g., ERP system 102, CRM 103, legacy systems 104, etc.). In the embodiment illustrated by FIG. 2A, active designer component 154 divides the data into transaction channels 155 (i.e., the method by which the data arrives) and transaction formats 156 (i.e., the method by which the data is interpreted). Extensible Markup Language (XML) is then used to specify the format of the records as well as the values to be used in those records. Other types of data formats may be used as well. The data is then interpreted as logical instances of transaction sources 150 and transmitted to a data flow service 160, which, in one embodiment, is a component part of enterprise link 110. As noted above, the data may also be transmitted to the enterprise link through HTTP requests and/or API calls and/or Web Services. FIG. 2B illustrates a web server 135 in the enterprise link 110 receiving data through HTTP requests 136 and API calls 137.

According to the embodiment illustrated by FIG. 2A, data flow service 160 includes a plurality of data flow plans 162, 164, 166, as well as a data repository 170 which contains one or more lists of data flow definitions on how to operate on the data. Once the lists of data flow definitions have been created, they may be stored in a data repository 170. Note, however, that it is data flow service 160 that actually executes or edits the data flow plans 162, 164, 166, etc. One exemplary data flow service that can be utilized is the one described in U.S. Pat. No. 6,243,698 entitled "Extensible Database Retrieval and Viewing Architecture. Other types of data flow services may be used as well.

Data flow plans 162, 164, 166, etc., include executable code for accessing, manipulating, and/or outputting data received from the enterprise computing runtime environment 101. A plan monitoring service 175 is connected to data flow service 160. Plan monitoring service 175 examines the data flow plan links to datasets 180 that are defined in ADC 120 and causes data flow service 160 to run the plans associated with each dataset. Plan monitoring service 175 may also include a user interface 185 to monitor the data flow service 160 to ensure that all of the data flow plans 162, 164, 166, etc., are being executed properly. In one embodiment, user interface 185 allows data flow plans 162, 164, 166, etc., to be extensible. That is, new steps can be defined through user interface 185 without having to change the application to support the new steps. User interface 185 can thus create a new set of transaction channels and transaction formats without having to recompile the enterprise runtime computing environment 101.

Enterprise link 110 is also able to replicate existing metadata in the enterprise runtime computing environment 101 by importing datasets definitions from the existing enterprise systems into the active designer component through network link 138. In this manner, whenever an enterprise link is installed in an organization, there is no need to define an entirely new set of metadata conforming to the existing enterprise systems.

FIG. 3 is an example of data stored in a data set in tabular form in an active data cache according to one embodiment of the present invention. In the example of FIG. 3, the enterprise link is used to monitor the business activity state of a casino business in real-time. For example, all of the gaming devices (e.g., slot-type machines, video-poker machines, lottery machines, etc.) in a particular casino may be connected to a database server via a communication interface associated with each gaming device. A tabular form 190 contains a variety of data entry fields and associated labels. For instance, there are data entry fields corresponding to the slot-type machine identification 191, the identification of the current player operating the slot machine 192 (e.g., as identified by a player card inserted in the slot machine), the amount of time the slot machine is idle 193, and the payout over time 194.

When a data event occurs (such as each time a particular player uses an identified machine), the new data generated by the machine is recorded into the database. This data is then transmitted by the database server to the enterprise link over a network through a message queuing system. Alternatively, the data generated by the slot machine could be sent directly to the message queuing system through some intermediate application monitoring the machine, bypassing the database recording step. Using the enterprise link in the manner described herein, the data associated with the event is then manipulated by the data flow service according to the executing data flow plans previously created by the active designer component. This manipulated data is then transmitted via a network connection to the ADC where it is stored and made accessible to the end-user. This data may be accessed by the end user from anywhere across the enterprise (or even across the globe, if necessary, using an Internet connection).

Figure 4:
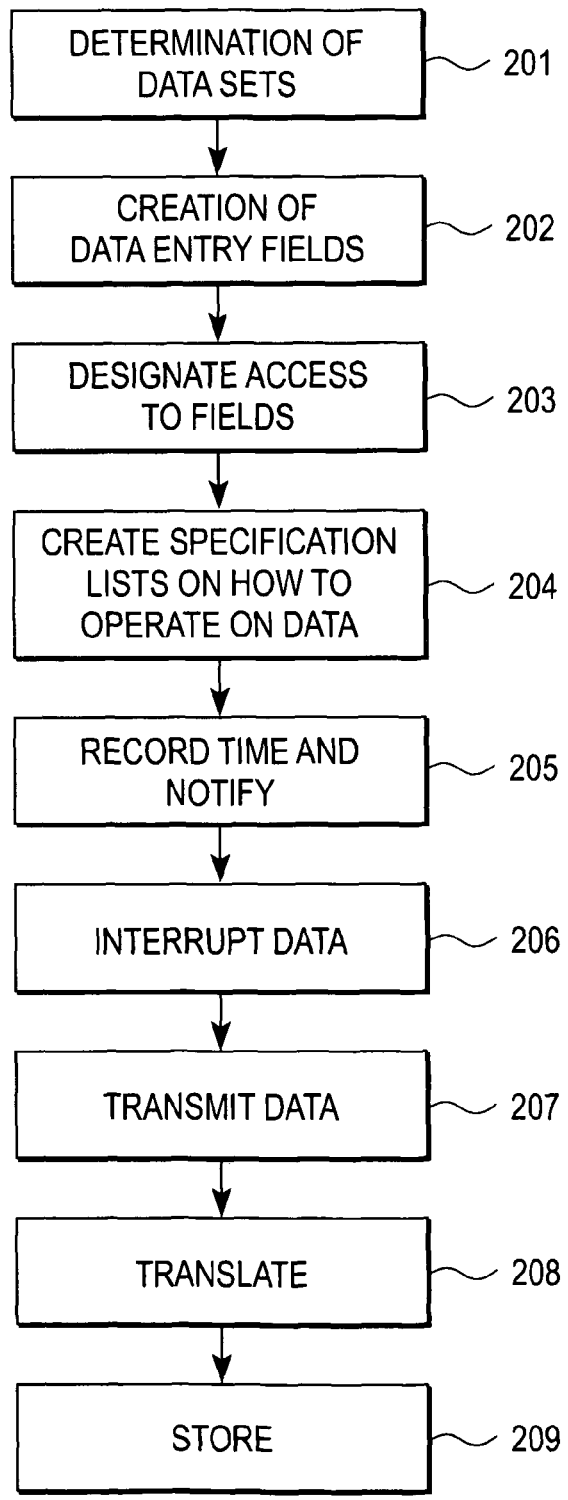
FIG. 4 is a flow chart illustrating the steps of an active design process using an active designer according to one embodiment of the present invention.

FIG. 4 is a flow chart illustrating the steps of an active design process using the active designer component in accordance with one embodiment of the present invention. In the exemplary process shown, a user first determines what datasets are to be stored in the ADC (block 201), which involves the creation of the data entry fields to be included in the datasets (block 202) and designating who may have access to these fields (block 203). The user then creates one or more lists of data flow definitions of operations to be performed on the data in response to messages arriving on the message queues (or HTTP, API calls, web services, etc.) (block 204) For instance, this may involve keeping a record of every order, of the person who made the order, of the time the order occurred, and then notify every salesperson in the organization about the order (block 205). The data in the enterprise runtime computing environment is then interpreted as logical instances of transaction sources (block 206) and transmitted to a data flow service in the enterprise link in real-time (block 207) where it is translated (block 208) and used to create and/or update one or more data sets in the ADC (block 209).

Figure 5:
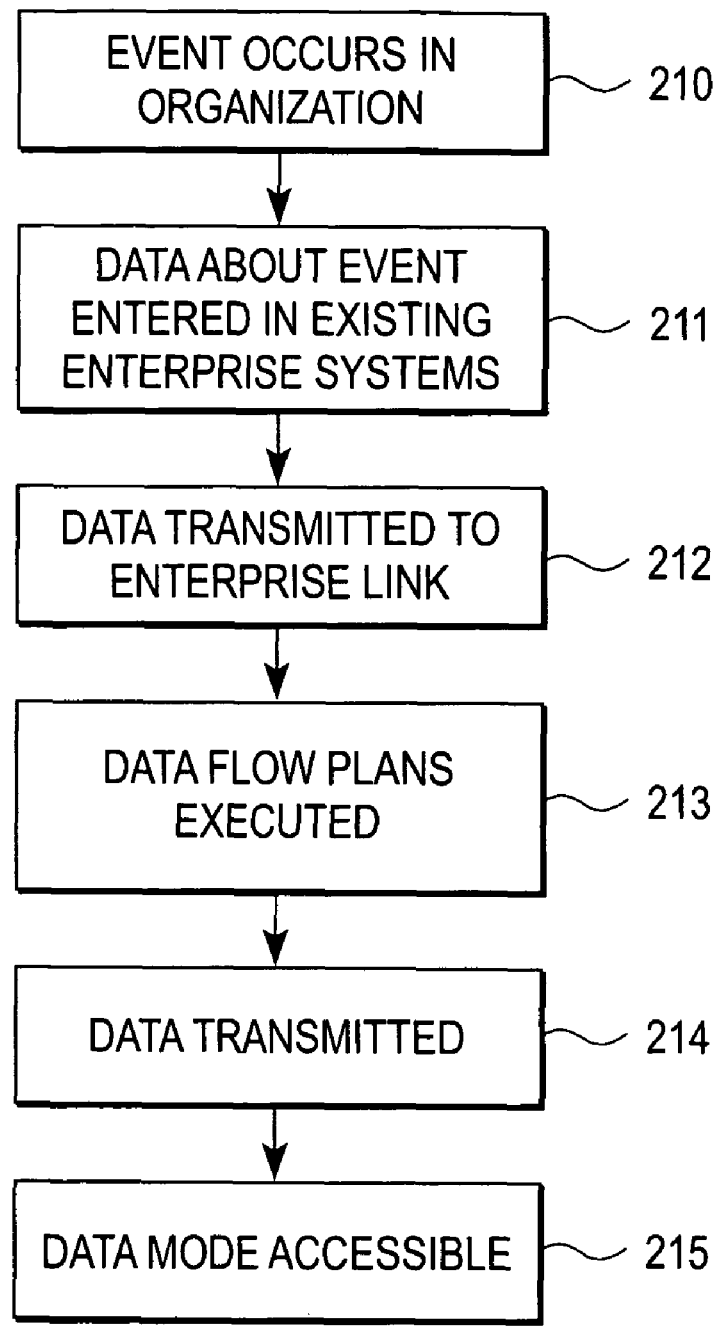
FIG. 5 is a flow chart illustrating the steps of utilizing an enterprise link to obtain real-time data from disparate systems in an organization according to one embodiment of the present invention.

FIG. 5 is a flow chart illustrating the process of utilizing an enterprise link system to obtain real-time data from disparate systems in an organization according to one embodiment of the present invention. The process begins with the occurrence of an event in a system of the organization (block 210) which causes data from the event to be entered into an existing enterprise system within the organization (e.g., a CRM system) (block 211). The data is transmitted over the Internet to an enterprise link through a message queuing system (block 212). A data flow service in the enterprise link then executes one or more data flow plans to operate on the data (block 213). After it has been operated on, the data is transmitted to the ADC (block 214) where it is accessible to an end user (block 215).

Figure 6:
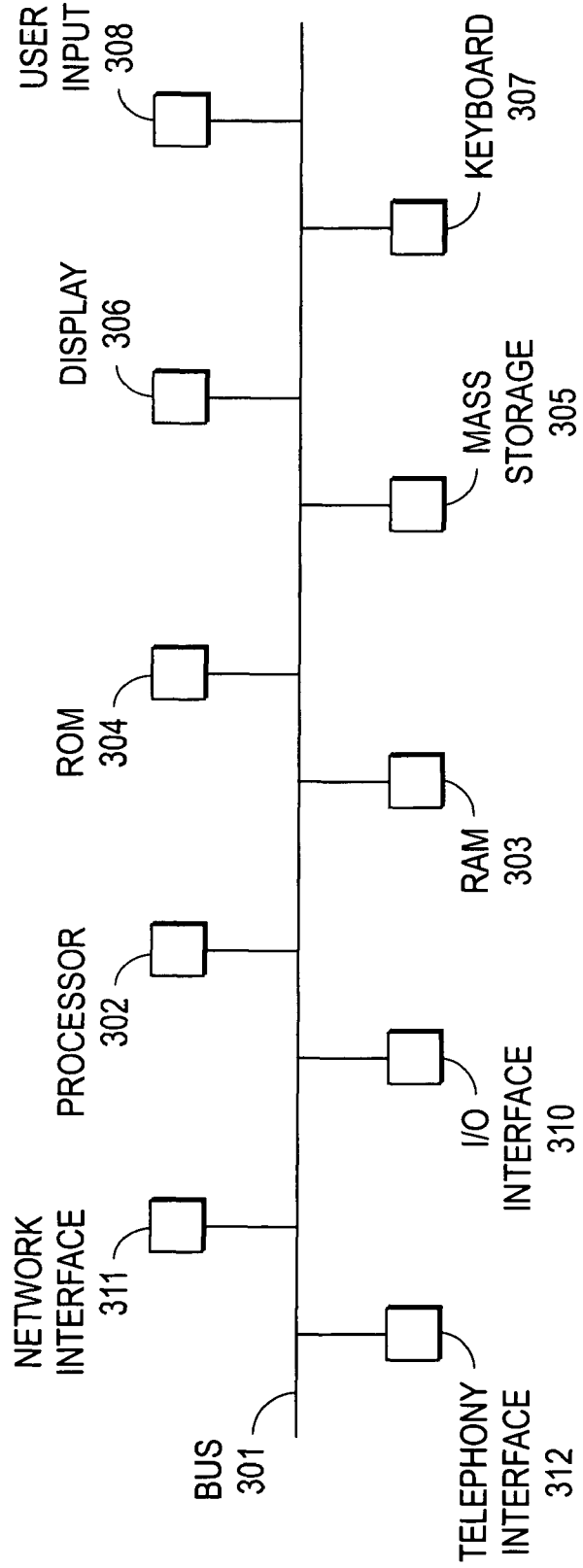
FIG. 6 is an example of a computer system utilized in conjunction with one embodiment of the present invention.

FIG. 6 is shown an example of a computer system on which the present techniques may be implemented according to one embodiment of the present invention. Computer system 300 includes a processor 302 coupled through a bus 301 to a random access memory (RAM) 303, a read only memory (ROM) 304, and a mass storage device 305. Mass storage device 305 can be a disk or tape drive or other device for storing data and instructions. A display device 306 for providing a graphical output of the reported data is shown coupled to processor 302 through bus 301. A keyboard 307 is coupled to bus 301 for communicating information and command selections to processor 302. Another type of user input device is cursor control unit 308, which may be a device such as a mouse or trackball, for communicating direction commands that control cursor movement on display 306. Also coupled to processor 302 via bus 301 is an input/output (I/O) interface 310, which can be used to control and transfer data to electronic devices connected to computer 300 (such as other computers, storage devices, peripheral components, and the like). Processor 302 may also be connected to a telephony interface 312 through bus 301. Practitioners in the art will appreciate that display device 306, keyboard 307, and cursor control unit 308 may not be needed after the operating software has been installed in computer system 300.

Continuing with the example of FIG. 6, a network interface device 311 is shown coupled to bus 301 to provide a physical and logical connection between computer system 300 and the network medium. Depending on the network environment in which computer 300 is used, this connection may comprise a server or a network router connected with another client computer.

Figure 7:
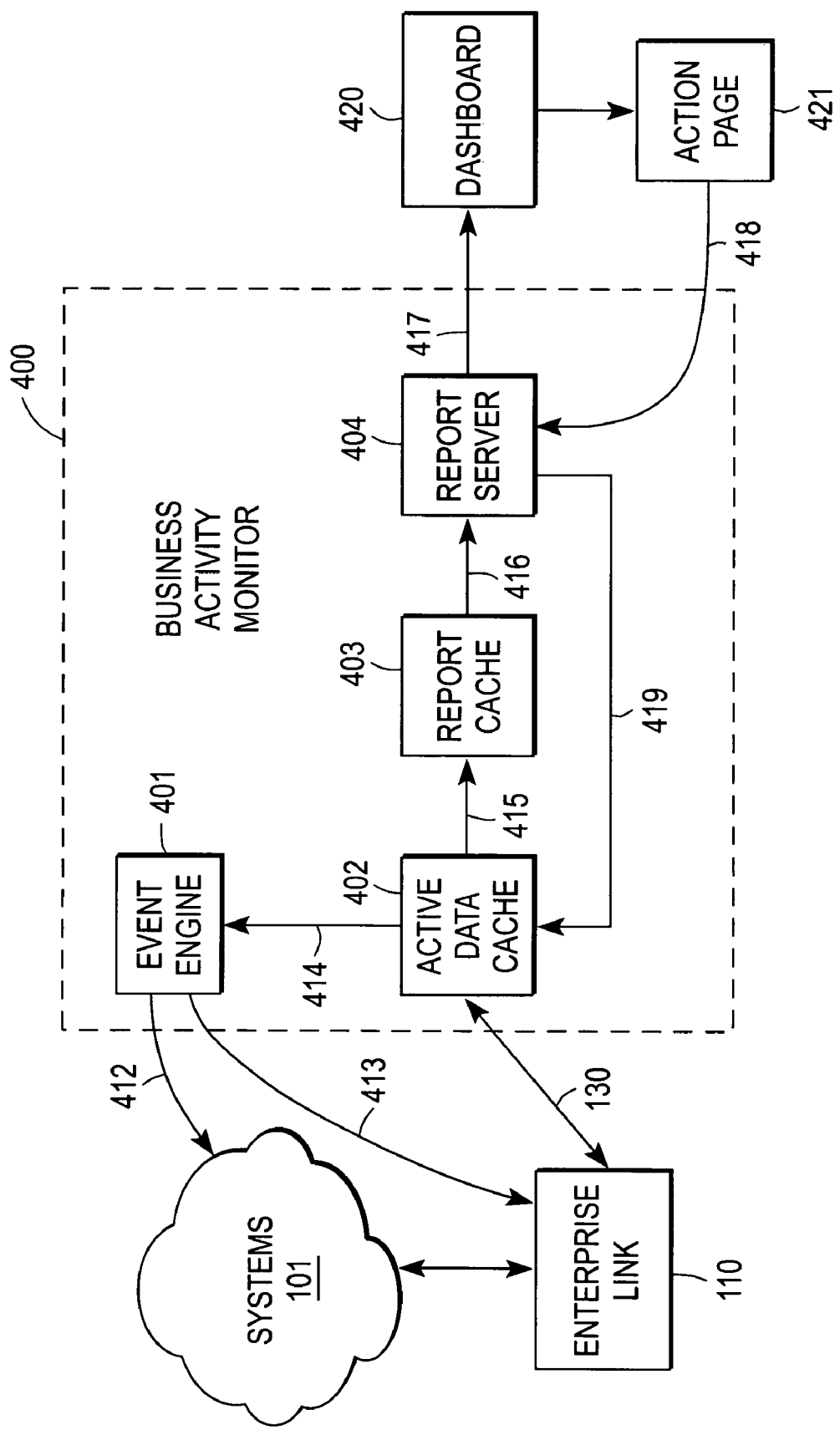
FIG. 7 is an architectural block diagram of a business intelligence system according to one embodiment of the present invention.

FIG. 7 is an architectural block diagram of a business intelligence system according to utilized in conjunction with one embodiment of the present invention. The system of FIG. 7 includes a plurality of enterprise applications/systems 101 comprising a computing environment which generates and stores raw (source) data in the manner previously described in connection with FIGS. 1 & 2. Enterprise link 110 is a real-time data integration engine that operates to continually retrieve source data from enterprise systems 101, integrate the disparate raw data, transform the data according to predefined data flow definitions or plans, and load the resulting data into active data cache 402 via connection 130. Active data cache (ADC) 402 operates and functions in the same manner as previously described; that is, ADC 402 updates the datasets that contain the enterprise data in a defined format. In the architecture of FIG. 7, ADC 402 is shown being arranged as a component in a business activity monitor (BAM) 400. In the embodiment shown, BAM 400 includes event engine 401, report cache 403, and report server 404.

The business activity monitoring architecture of FIG. 7 utilizes messaging, data integration, active data caching, analytics monitoring, alerting, and reporting technologies to deliver configurable information to an end user within seconds (e.g., 2-10) of an enterprise event or change in status. Streaming data delivery ensures that real-time reports or data displays are automatically and continually updated as changes occur in the underlying data. Thus, the architecture of FIG. 7 enables managers and business executives to monitor end-to-end business processes in real-time and to make decisions and take immediate actions that impact overall business performance.

With continuing reference to FIG. 7, report cache 403 is shown coupled with ADC 415 via a network connection 415, and with report server 404 via a connection 416. Together, report cache 403 and report server 404 comprise a report engine that accesses data in ADC 401, formats the data, and then streams it out via network connection 417 (e.g., an Internet protocol network) for a "live" report on a display screen of a real-time dashboard 420. Dashboard 420 is typically implemented by a software program or application running on a computer (or downloaded from a server) to create a graphical user interface (GUI). Reports may be provided in a variety and combination of view types, including charts, columnar, cross tab, spreadsheets, Key Performance Indicators (KPIs), lists, and more.

When a user of dashboard 420 requests a particular report, the report cache 403 obtains a "snapshot" of the most current data available in ADC 401. The data snapshot is then sent to dashboard 420 by report server 404, which continually processes the data as it changes such that those changes are integrated into the live display provided to the end user. The result is up to the second (i.e., real-time) information delivered in a visual presentation to the user.

In the exemplary embodiment of FIG. 7 dashboard 420 comprises a GUI that includes an action page 421 which can be used in the same environment to take a variety of actions in response to changing data, including notifying appropriate users with alerts and/or reports. In other words, a user viewing the dashboard screen may take actions—without leaving the user interface of the dashboard application—to trigger corrective changes at the back-end enterprise systems 101. This obviates the need to switch between different interfaces, systems, or applications in order to perform various actions in response to the information displayed on the dashboard screen or report. In an alternative embodiment, dashboard 420 itself functions as the action page.

In a specific implementation, when a user specifies a certain action via action page 421 an XML message is generated and sent to report server 404 via connection 418. For example, a contact center manager viewing dashboard 420 may decide to reassign a set of cases from agents in one geographic region to agents located in a different region based on current demand and workload conditions. In response to the XML message that identifies the cases for reassignment, report server 404 inserts a data object in ADC 402 via connection 419. The data object then generates an alert 414 with the reassign cases message included to event engine 401. An appropriate alert may be generated each time data in the data object changes or when the data exceeds certain parameters/thresholds. It is appreciated that multiple messages may be grouped and sent (e.g., one for each reassign case) as part of a single alert transaction.

Through the alert mechanism, event engine 401 is able to monitor changing conditions in the data and the system in real-time based upon user-defined rules. For instance, in response to alert 414, event engine 401 may trigger one or more actions back in the enterprise systems 101 via an external web service call 412. Event engine may also make changes to the data flow definitions used by enterprise link 110 via connection 413. (Note that for clarity reasons, the active designer component is not shown in FIG. 7.)

A few seconds after web service call 412 is sent and received by the enterprise systems 101, the action is implemented and another web service call arrives at ADC 402 (e.g., via enterprise link 110 and connection 130) indicating a change in the data; in the above example, that the designated contact center cases have actually been reassigned. Thus, in one aspect of the present invention, real-time (i.e., 2-10 seconds) immediate feedback of a result is delivered to the user based on action taken by the user from the dashboard environment.

Practitioners in the arts will understand that the action page itself may be filtered, sorted, grouped, etc., based on certain items or data types presented in the dashboard, or depending on particular applications. For example, if an action page is invoked by a user "right-clicking" on a mouse when the cursor is over a section of a pie-chart that shows cases for the city of Vancouver, the resulting action page may be filtered automatically to show only those cases that are currently in the Vancouver contact center.

Figure 8A:
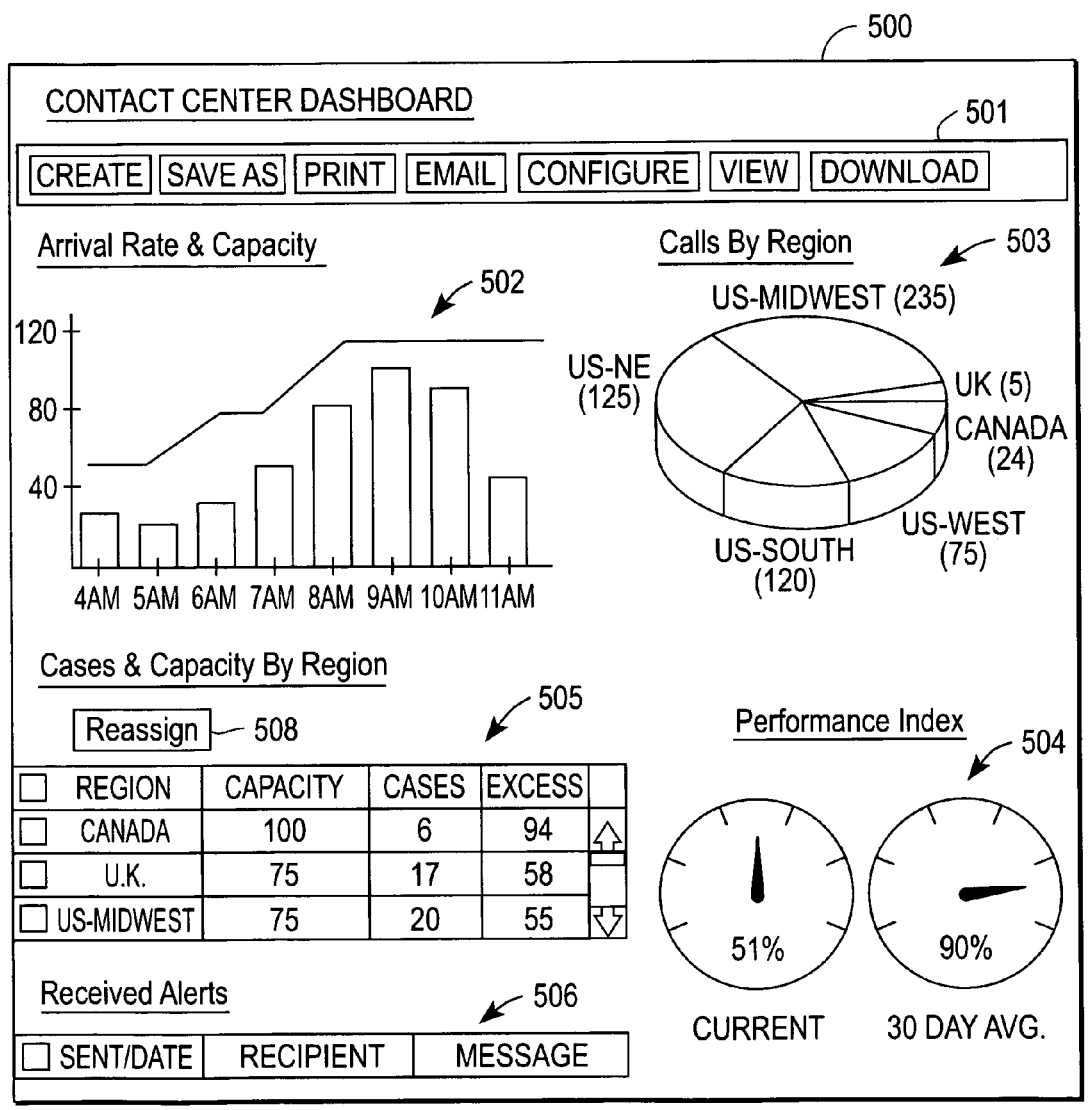
FIGS. 8A-8D illustrate an exemplary process that utilizes a dashboard and graphical user interface for immediate action in accordance with one embodiment of the present invention.

FIGS. 8A-8D are example snapshots of a contact center dashboard 500 implemented as a GUI that includes a toolbar 501 and various data display fields 502-506. FIG. 8A, for instance, shows call arrival rate & capacity information in data field 502, calls by region in data field 503, current versus 30-day average performance index monitors in data field 504, and cases & capacity by geographic region in data field 505. Data field 506 lists all received alerts, which, at this particular point in time is empty (no alerts). Note that a reassign button 508 is located just below the caption area of data field 505. As will be described in more detail below, clicking on (with a mouse or other cursor device) button 508 invokes an action page that may be used to reassign cases from one region to another.

Figure 8B:
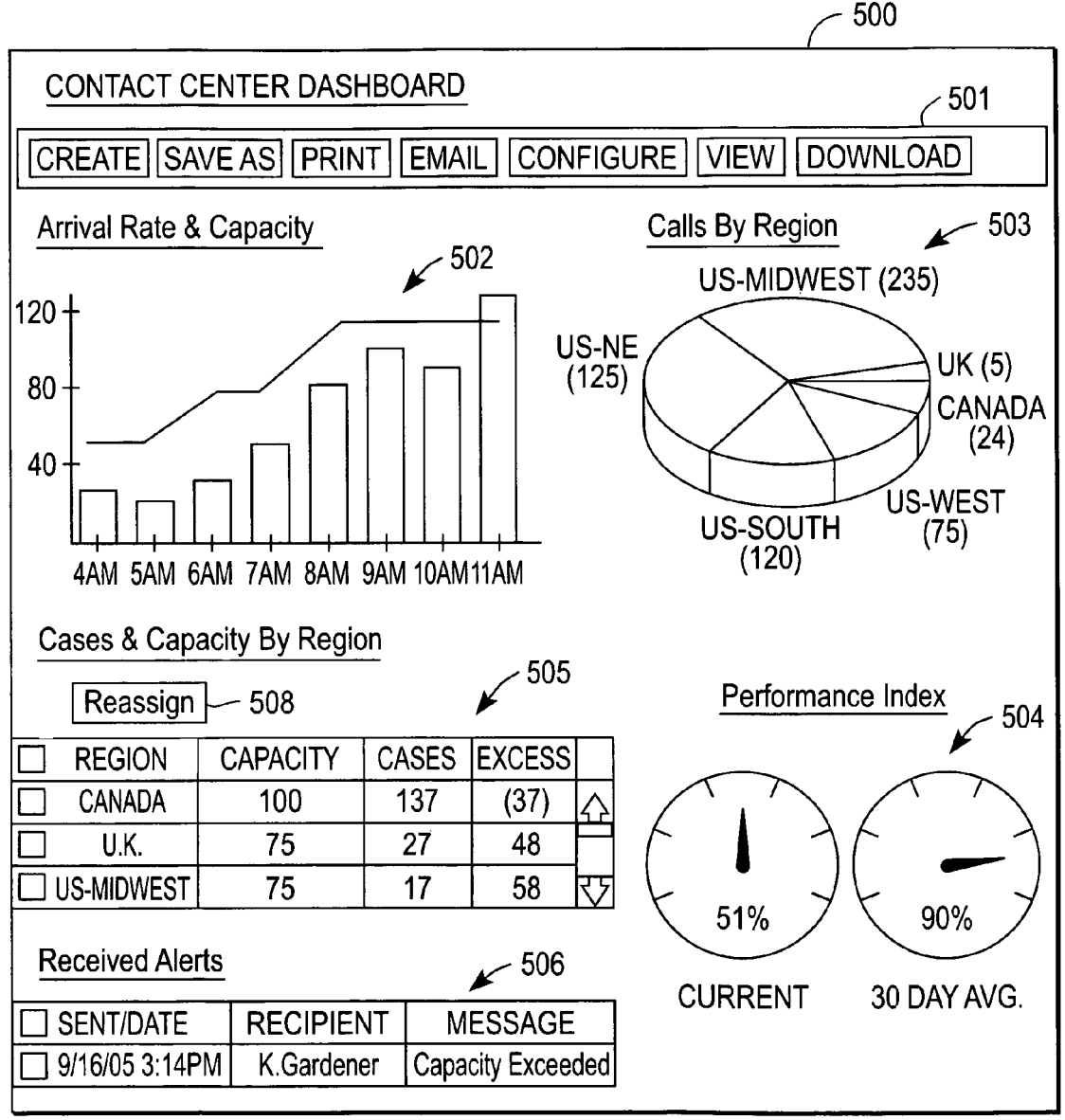

In FIG. 8B, the contact center dashboard of FIG. 8A is shown a short while later; i.e., at a time When the number of cases in Canada has exceeded the available capacity. For example, data field 505 shows that 137 cases are currently in the Canadian contact center region—37 more than its capacity of 100. In response, data field 506 shows that a message has been sent alerting the appropriate person (e.g., K. Gardener) of this condition.

Figure 8C:
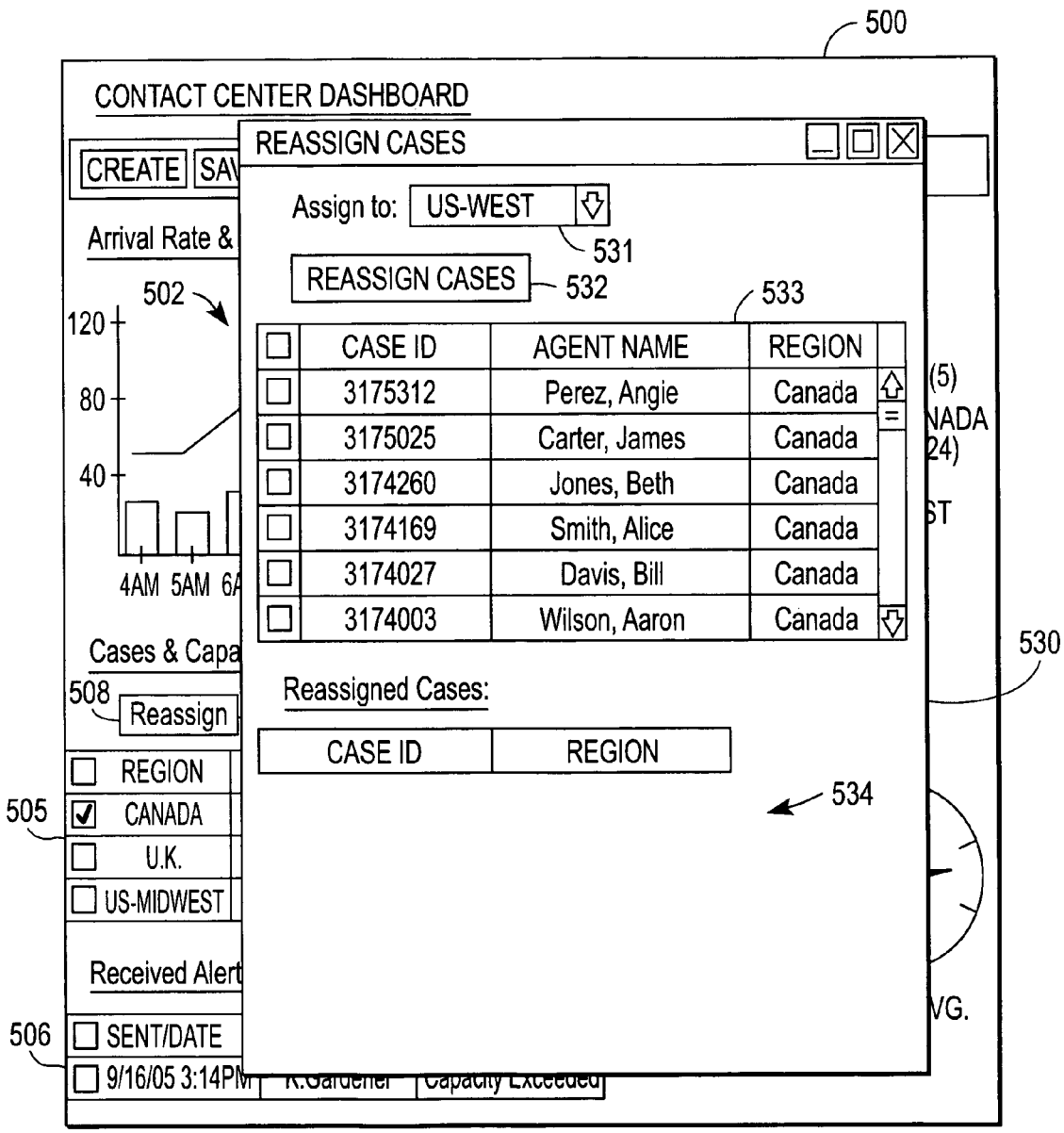

FIG. 8C illustrates dashboard 500 after a user has selected (e.g., checked) the box next to Canada in the region listing of data field 505 and then selected (e.g., clicked) the reassign cases button 508. These steps produce action page 530, which is shown overlaying the various dashboard data fields. Action page 530 includes a pull-down menu 531 for choosing another geographic region where the selected cases are to be assigned, a field 533 that lists all of the active cases currently in Canada (by case ID, agent name, region, etc.), a field 534 that lists all of the cases that have actually been reassigned (currently empty), and a reassign cases button 532 that causes the selected cases to be reassigned. In this example, the user simply checks the corresponding boxes of those cases to be reassigned (e.g., to the US-West region) and then clicks on button 532 to effectuate the changes.

Figure 8D:
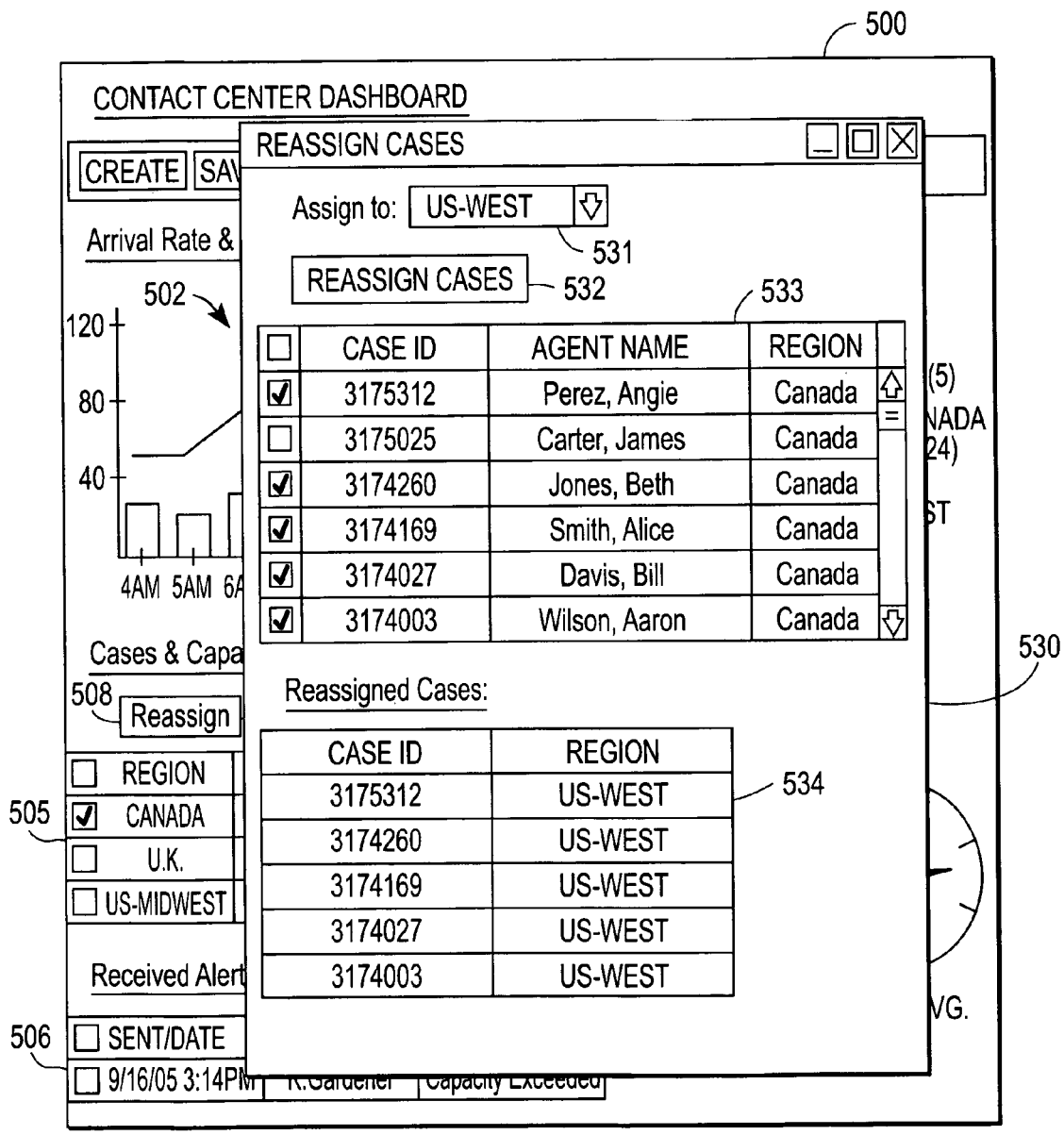

FIG. 8D shows action page 530 after the user has: (1) selected those cases to be reassigned to the US-West region; (2) clicked on reassign cases button 532; (3) after the reassignments have been implemented in the external applications or systems; and (4) after the data has changed, with the changes being reported back to dashboard 420. As can be seen, the data changes are also reflected in data field 534 of action page 530, which lists all of the cases that were reassigned as a result of the action taken. It is appreciated that because the architecture of FIG. 7 operates in real-time to continually process data as it changes, and to integrate those changes into the live display of dashboard 420, it only takes on the order of 2-10 seconds from the time that a user executes an action via page 530 (e.g., reassign cases) to the time that the data changes appear on dashboard 420.

Figure 9:
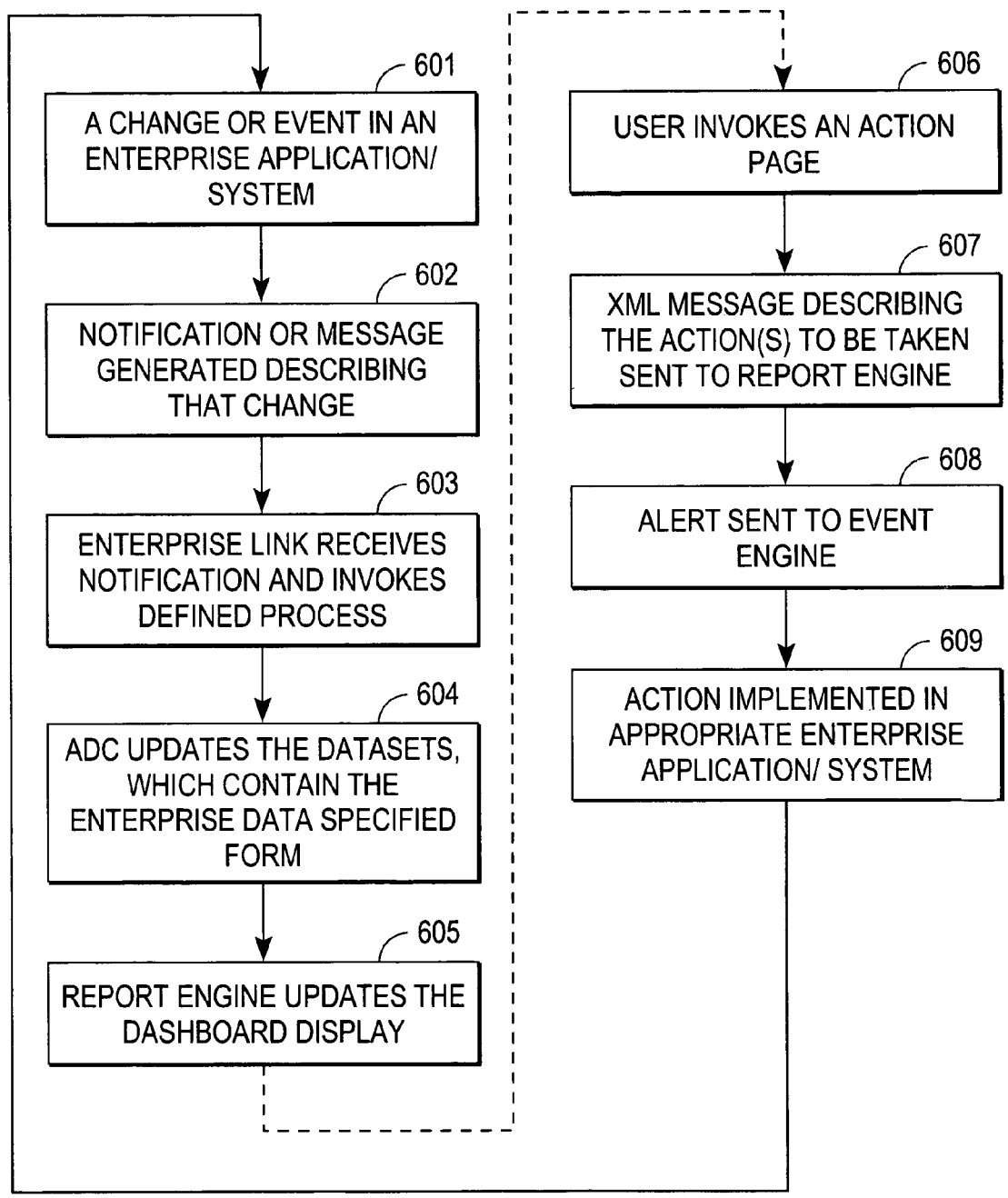
FIG. 9 is a flow chart showing operations of a business intelligence system in accordance with one embodiment of the present invention.

FIG. 9 is a flow diagram showing basic operations of a business activity monitoring system according to one embodiment of the present invention. The process begins with the occurrence of a change or event within an enterprise application/system (block 601), which causes that application/system to generate a notification or message describing that change (block 602). The enterprise link receives the notification and invokes the defined process to handle that specific type of notification (block 603). After the data has been operated on by the enterprise link, the active data cache updates the datasets, which contain the enterprise data in the form that the end users want it to appear (block 604). In one implementation, the active data cache may also notify the BAM event engine and the BAM report engine of the data changes. The event engine may then determine whether any defined rules (e.g., defined by a BAM architect or business user) should be invoked as a result of the changes. If so, the event engine invokes the appropriate actions, such as sending an alert message to one or more users. The report engine updates the active reports that are being displayed to the end users (e.g., via dashboard 420) to reflect the changes to the data. Normally, the report engine operates to continually update the active reports until the user closes the displayed report.

The right-hand side of FIG. 9 illustrates the steps involved when a user takes immediate action based on real-time data displayed on a dashboard screen. (The dashed arrow denotes that user actions are optional; that is, the system may continue to stream data changes to the end users without any action being taken in response.) In the embodiment of FIG. 9, actions are initiated by a user invoking an action page in the dashboard application (block 606). Execution of the action causes an XML message to be sent to the report engine (block 607), followed by a data object being inserted into the active data cache and an alert being sent to the BAM event engine (block 608). The event engine implements the action via web service calls to the appropriate enterprise applications or systems (block 609), which triggers a change in the data that causes the steps illustrated in blocks 601-605 to be repeated (i.e., a direct data feedback loop to the dashboard display).

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A business intelligence system for an enterprise, comprising:
   a business activity monitor (BAM) comprising a data cache to receive and store enterprise data from an enterprise link, the enterprise link being configured to:
   continually retrieve raw data from a plurality of enterprise applications, at least two of the plurality of enterprise applications exchanging information with each other;
   integrate and transform the raw data into the enterprise data according to predefined data flow definitions, such that the data cache is updated in real-time as the enterprise data changes; and
   import existing metadata from the plurality of enterprise applications;
   the BAM further comprises a report engine that is configured to access the enterprise data in the data cache, format the enterprise data, and stream it to a computer for real-time display, the report engine being further configured to insert a data object into the data cache in response to a first message, the data object for generating an alert to trigger an action to be executed using one or more enterprise applications of the plurality of enterprise applications; and
   the computer coupled with the data cache to receive real-time updates to the enterprise data from the data cache, the computer configured to run a program that produces a graphical user interface on a display, the graphical user interface configured to:
   display a real-time unified report of the enterprise data from the plurality of enterprise applications to a user via the graphical user interface;
   use the existing metadata imported from the plurality of enterprise applications by the enterprise link;
   receive, from the user via the graphical user interface, a first action that affects operation of a first enterprise application of the plurality of enterprise applications and a second action that affects operation of a second enterprise application of the plurality of enterprise applications, wherein:
   the first action includes the user, via the graphical user interface, causing a report to be sent to another user; and
   cause the computer to send the first message designating one or more selected actions to the BAM, wherein the BAM is configured to send a second message, in response to receiving the first message, to one or more of the enterprise applications to execute the one or more selected actions,
   such that the computer concurrently displays the enterprise data from the enterprise applications to the user and receives actions that trigger changes to operation of the enterprise applications from the user via a single graphical user interface.

2. The business intelligence system of claim 1 wherein the BAM further comprises:
   an event engine that generates the second message in response to receipt of the alert from the data cache.

3. The business intelligence system of claim 2 wherein the report engine comprises a report server.

4. The business intelligence system of claim 1 wherein the page further includes a data field listing of the one or more actions after each has been completed.

5. The business intelligence system of claim 4 wherein the data field listing is displayed within a period of 10 seconds or less after selection of the second button by the user.

6. The business intelligence system of claim 2 wherein the second message comprises a web service call.

7. A business intelligence system comprising:
   a business activity monitor (BAM), comprising a data cache to receive and store enterprise data and a computer system, configured to:
   integrate and deliver, in real-time, the enterprise data generated by a plurality of enterprise applications, the enterprise data being received from an enterprise link, the enterprise link being configured to
   continually retrieve raw data,
   integrate disparate raw data into the enterprise data, and
   import existing metadata from the plurality of enterprise applications, and
   update the enterprise data in real-time responsive to a business event that produces a change in the enterprise data, at least two of the plurality of enterprise applications exchanging information with each other,
   the BAM further comprising a report engine that is configured to access the enterprise data in the data cache, format the enterprise data, and stream the enterprise data for real-time display, the report engine configured to inserting a data object into the data cache in response to a first message, the data object for generating an alert to trigger an action to be performed using one or more enterprise applications of the plurality of enterprise applications; and a dashboard to display the enterprise data delivered by the BAM in real-time, the dashboard including a user interface that allows a user to select one or more actions based on the enterprise data being displayed, wherein:

a first action of the one or more actions affects operation of a first enterprise application of the plurality of enterprise applications, a second action of the one or more actions affects operation of a second enterprise application of the plurality of enterprise applications, the user interface sends the first message to the BAM in response to a command to perform at least one action selected by the user, the first message causes the BAM to send a second message to one or more of the enterprise applications for executing the one or more actions, such that the dashboard concurrently displays the enterprise data from the enterprise applications to the user and receives actions that trigger changes to operation of the enterprise applications from the user via a single graphical user interface, and use the existing metadata imported from the plurality of enterprise applications by the enterprise link.

8. The business intelligence system of claim 7 wherein the first message comprises an Extensible Mark-up Language message.

9. The business intelligence system of claim 7 wherein the one or more actions constitute a new business event that changes the enterprise data, the changed enterprise data being displayed on the dashboard within a period of 10 seconds or less after input of the command by the user.

10. A business intelligence system for an enterprise, comprising:

a computing environment that includes a plurality of enterprise applications that produce enterprise data;

a data integration engine that integrates, in real-time, the enterprise data;

a business activity monitor (BAM) that includes:

a data cache to receive and store the enterprise data integrated from the enterprise applications, the data cache being updated in real-time as the enterprise data changes, at least two of the plurality of enterprise applications exchanging information with each other; and a report engine that accesses enterprise data in the data cache, formats the enterprise data, and then outputs the enterprise data as a data stream that changes in real-time as the enterprise data in the data cache changes, the report engine inserting a data object into the data cache in response to a first message in response to a first action, the data object for generating an alert to trigger an action to be performed using one or more enterprise applications of the plurality of enterprise applications;

a computer that runs a program to produce a graphical user interface on a display, the graphical user interface:

including a presentation of the enterprise data provided in the data stream, providing a page for inputting user-specified actions, wherein:

the first action of the user-specified actions affects a change in a process of a first enterprise application of the plurality of enterprise applications, wherein the first action causes a report to be sent to another user, and a second action of the user-specified actions affects a change in a process of a second enterprise application of the plurality of enterprise applications, generating the first message output to the BAM in response to a command to perform at least one action selected by the user, the first message causing the BAM to send a second message to one or more of the enterprise applications for executing the at least one action, such that the computer concurrently displays the enterprise data from the enterprise applications to the user and receive actions that trigger changes to operation of the enterprise applications from the user via a single graphical user interface.

11. The business intelligence system of claim 10 wherein the first message comprises an Extensible Mark-up Language message.

12. The business intelligence system of claim 10 wherein the at least one action constitutes a new business event that changes the enterprise data, the changed enterprise data being displayed by the computer within a period of 10 seconds or less after input of the command.

13. The business intelligence system of claim 10 wherein the BAM further comprises:

an event engine that generates the second message in response to receipt of the alert from the data cache.

14. The business intelligence system of claim 10 wherein the report engine comprises a report server.

15. The business intelligence system of claim 10 wherein the page further includes a data field listing of the one or more actions after each has been completed.

16. A computer-implemented method for operational management of business processes, comprising:

(a) integrating enterprise data in real-time, the enterprise data being obtained from a plurality of enterprise applications, at least two of the plurality of enterprise applications exchanging information with each other, the enterprise data being received from an enterprise link, the enterprise link being configured to continually retrieve raw data, integrate disparate raw data into the enterprise data, and import existing metadata from the plurality of enterprise applications;

(b) storing the integrated enterprise data in a data cache;

(c) extracting portions of the enterprise data from the data cache;

(d) delivering the portions of the enterprise data in real-time to a graphical user interface (GUI) for viewing by a user;

(e) providing, on the GUI, a page that allows the user to specify one or more operations that are capable of triggering a change in the enterprise data of more than one enterprise application of the plurality of enterprise application, such that the GUI concurrently delivers the portions of the enterprise data for viewing by the user and receive the one or more specified operations that trigger the changes in the enterprise data of the more than one enterprise application of the plurality of enterprise applications via a single graphical user interface, and use the existing metadata imported from the plurality of enterprise applications by the enterprise link;

(f) inserting a data object into the data cache in response to a first message, the data object for generating an alert, wherein the first message was received in response to a command to perform at least one action selected by a user.

17. The computer-implemented method of claim 16 further comprising:
(f) repeating (a)-(e) in response to the change in the enterprise data.

18. The computer-implemented method of claim 16 wherein the changed enterprise data is displayed on the GUI within a period of 10 seconds or less after input of the one or more operations by the user.

19. A computer-implemented method for operational management of business processes, comprising:
displaying of enterprise data on a dashboard screen, the enterprise data being obtained from a plurality of enterprise applications, at least two of the plurality of enterprise applications exchanges information with each other, the enterprise data being received from an enterprise link, the enterprise link being configured to continually retrieve raw data, integrate disparate raw data into the enterprise data, and import existing metadata from the plurality of enterprise applications;
updating the display in real-time responsive to a business event that results in a change to the enterprise data;
retrieving a real-time snapshot of enterprise data based upon a user request;
providing a user interface on the dashboard screen with a field that allows the user to specify one or more operations, wherein:
the graphical user interface uses the existing metadata imported from the plurality of enterprise applications by the enterprise link,
a first operation of the one or more operations changes the enterprise data of a first enterprise application of the plurality of enterprise applications, and
a second operation of the one or more operations changes the enterprise data of a second enterprise application of the plurality of enterprise applications; and
receiving a command from a user via the user interface to implement the one or more operations concurrently with the displaying of the enterprise data on the dashboard screen.

20. The computer-implemented method of claim 19 wherein the changed enterprise data is displayed on the GUI within a period of 10 seconds or less after input of the one or more operations by the user.

21. A non-transitory computer program product stored on a computer-readable medium configured to store instructions operational by a processor of a computer system for operational management of business processes, the computer program product comprising:
code for displaying enterprise data on a dashboard screen, the enterprise data being obtained from a plurality of enterprise applications, at least two of the plurality of enterprise applications exchanges information with each other, the enterprise data being received from an enterprise link, the enterprise link being configured to:
continually retrieve raw data,
integrate disparate raw data into the enterprise data, and
import existing metadata from the plurality of enterprise applications;
code for updating the display on the dashboard screen in real-time responsive to a business event that results in a change to the enterprise data;
code for retrieving a real-time snapshot of enterprise data based upon a user request;
code for providing a user interface on the dashboard screen with a field that allows the user to specify one or more operations, wherein:
the user interface uses the existing metadata imported from the plurality of enterprise applications by the enterprise link,
a first operation of the one or more operations changes the enterprise data of a first enterprise application of the plurality of enterprise applications, and
a second operation of the one or more operations changes the enterprise data of a second enterprise application of the plurality of enterprise applications; and
code for receiving a command via the user interface to implement the one or more operations concurrently with the displaying of the enterprise data on the dashboard screen.

22. The computer program product of claim 21, wherein the one or more operations affect the enterprise data produced by the enterprise applications, and further comprising:
code for displaying changed enterprise data on the dashboard screen within 10 seconds or less after input of the command, the changed enterprise data reflecting execution of the one or more operations.

23. The business intelligence system for the enterprise of claim 1, wherein the actions that trigger changes to operation of the enterprise applications from the user via the single graphical user interface are processed in real-time.

24. The business intelligence system of claim 1 wherein changes to the data cache occur at a rate substantially matched with real-time data changes occurring in at least two of the enterprise applications.

* * * * *

UNITED STATES PATENT AND TRADEMARK OFFICE
CERTIFICATE OF CORRECTION

PATENT NO. : 8,165,993 B2  
APPLICATION NO. : 11/299441  
DATED : April 24, 2012  
INVENTOR(S) : Broda et al.

Page 1 of 1

It is certified that error appears in the above-identified patent and that said Letters Patent is hereby corrected as shown below:

On page 4, in column 2, under "Other Publications", line 6, delete "Exhange," and insert -- Exchange, --, therefor.

On page 4, in column 2, under "Other Publications", line 57, delete "Institutue" and insert -- Institute --, therefor.

On page 4, in column 2, under "Other Publications", line 70, delete "Unuversity," and insert -- University, --, therefor.

In column 2, line 15, delete "OTLP" and insert -- OLTP --, therefor.

In column 10, line 2, delete "When" and insert -- when --, therefor.

In column 12, line 55, in Claim 7, delete "to" and insert -- to: --, therefor.

In column 13, line 3, in Claim 7, delete "inserting" and insert -- insert --, therefor.

Signed and Sealed this
Seventh Day of August, 2012

David J. Kappos
*Director of the United States Patent and Trademark Office*